United States Patent [19]

Hiller et al.

[11] Patent Number: 5,081,575

[45] Date of Patent: Jan. 14, 1992

[54] HIGHLY PARALLEL COMPUTER ARCHITECTURE EMPLOYING CROSSBAR SWITCH WITH SELECTABLE PIPELINE DELAY

[75] Inventors: John Hiller, New York; Howard Johnsen, Granite Spring, both of N.Y.; John Mason, Ramsey, N.J.; Brian Mulhearn, Paterson, N.J.; John Petzinger, Oakland, N.J.; Joseph Rosal, Bronx; John Satta, White Plains, both of N.Y.; Gerald Shurko, Ramsey, N.J.; Yedidiah Solowiejczyk; Kenneth Stamm, both of New York, N.Y.

[73] Assignee: Oryx Corporation, Paramus, N.J.

[21] Appl. No.: 348,161

[22] Filed: May 3, 1989

Related U.S. Application Data

[63] Continuation-in-part of Ser. No. 117,564, Nov. 6, 1987, abandoned.

[51] Int. Cl.$^5$ ............................................. G06F 7/04
[52] U.S. Cl. ............................ 395/325; 364/238.1; 364/229; 364/243; 364/243.1; 364/243.6; 364/268; 364/268.9; 364/231.8; 364/271.6; 364/DIG. 1
[58] Field of Search .................. 364/200 MS, 900 MS

[56] References Cited

U.S. PATENT DOCUMENTS

| | | | |
|---|---|---|---|
| 3,997,869 | 12/1976 | Cassarino, Jr. et al. | 364/200 |
| 4,051,551 | 9/1977 | Lawrie et al. | 364/200 |
| 4,075,693 | 2/1978 | Fox et al. | 364/200 |
| 4,223,391 | 9/1980 | Barnes | 364/900 |
| 4,325,116 | 4/1982 | Kranz et al. | 364/200 |
| 4,400,768 | 8/1983 | Tomlinson | 364/200 |
| 4,412,303 | 10/1983 | Barnes et al. | 364/900 |
| 4,438,494 | 3/1984 | Budde et al. | 364/200 |
| 4,494,190 | 1/1985 | Peters | 364/200 |
| 4,535,446 | 8/1985 | Mountain | 370/84 |
| 4,553,203 | 11/1985 | Rau et al. | 364/200 |
| 4,611,276 | 9/1986 | Vinot | 364/200 |
| 4,644,461 | 2/1987 | Jennings | 364/200 |
| 4,727,424 | 2/1988 | Chao | 364/724.01 |

FOREIGN PATENT DOCUMENTS 0165822 12/1985 European Pat. Off. .

OTHER PUBLICATIONS

Data sheet describing the Texas Instruments Digital Crossbar Switch, SN 54AS8890, dated Apr. 1987.

(List continued on next page.)

Primary Examiner—James W. Moffitt
Assistant Examiner—Rebecca L. Rudolph
Attorney, Agent, or Firm—Ostrolenk, Faber, Gerb & Soffen

[57] ABSTRACT

A crossbar switch which connects N ($N=2^k$; $k=0, 1, 2, 3$) coarse grain processing elements (rated at 20 million floating point operations per second) to a plurality of memories provides for a parallel processing system free of memory conflicts over a wide range of arithmetic computations (i.e. scalar, vector and matrix). The configuration of the crossbar switch, i.e., the connection between each processing element unit and each parallel memory module, may be changed dynamically on a cycle-by-cycle basis in accordance with the requirements of the algorithm under execution. Although there are certain crossbar usage rules which must be obeyed, the data is mapped over parallel memory such that the processing element units can access and operate on input streams of data in a highly parallel fashion with an effective memory transfer rate and computational throughput power comparable in performance to present-day supercomputers. The crossbar switch is comprised of two basic sections; a multiplexer and a control section. The multiplexer provides the actual switching of signal paths, i.e. connects each processing element unit to a particular parallel memory on each clock cycle (100 nsec). The control section determines which connections are made on each clock cycle in accordance with the algorithm under execution. Selectable pipelined delay in the control section provides for optimal data transfer efficiency between the processors and memory modules over a wide range of array processing algorithms. The crossbar switch also provides for graceful system degradation in computational throughput power without the need to download a new program.

11 Claims, 17 Drawing Sheets

OTHER PUBLICATIONS

Du, Hung-Chang, "On the Performance of Synchronous Multiprocessors", IEEE Trans. on Computers, vol. C-34, No. 5, pp. 462-466.

Small, Charles H., "IC Philosophies Vie for Glue-Logic Role", EDN, Jun. 8, 1989, pp. 101-107.

"Crossbar IC Cuts Cost of Parallel Processing", *Electronics*, Feb. 5, 1987, pp. 72-73.

B. Wilkinson et al., "Cross-Bar Switch Multiple Microprocessor System", *Microprocessors and Microsystems*, vol. 7, No. 2, Mar. 1983, pp. 75-78.

FIG. 3 ADDRESS REGISTER

```
         PMEM0    PMEM1    PMEM2    PMEM3    PMEM4    PMEM5    PMEM6    PMEM7
       +--------+--------+--------+--------+--------+--------+--------+--------+
#0  => | X(0)   | X(1)   | X(2)   | X(3)   | X(4)   | X(5)   | X(6)   | X(7)   |
       +--------+--------+--------+--------+--------+--------+--------+--------+
       | X(8)   |  ...   |  ...   |  ...   |  ...   |  ...   |  ...   |  ...   |
       +--------+--------+--------+--------+--------+--------+--------+--------+
       |  ...   |  ...   |  ...   |  ...   |  ...   |  ...   |  ...   |  ...   |
       +--------+--------+--------+--------+--------+--------+--------+--------+
       |  ...   |  ...   |  ...   | X(N)   |  ...   |  ...   |  ...   |  ...   |
       +--------+--------+--------+--------+--------+--------+--------+--------+
       |  ...   |  ...   |  ...   |  ...   |  ...   |  ...   |  ...   |  ...   |
       +--------+--------+--------+--------+--------+--------+--------+--------+
#28 => |  ...   |  ...   | Y(0)   | Y(1)   | Y(2)   | Y(3)   | Y(4)   | Y(5)   |
       +--------+--------+--------+--------+--------+--------+--------+--------+
       | Y(6)   | Y(7)   | Y(8)   | Y(9)   |  ...   |  ...   |  ...   |  ...   |
       +--------+--------+--------+--------+--------+--------+--------+--------+
       |  ...   |  ...   |  ...   |  ...   |  ...   |  ...   |  ...   |  ...   |
       +--------+--------+--------+--------+--------+--------+--------+--------+
       |  ...   |  ...   |  ...   |  ...   |  ...   | Y(N)   |  ...   |  ...   |
       +--------+--------+--------+--------+--------+--------+--------+--------+
       |  ...   |  ...   |  ...   |  ...   |  ...   |  ...   |  ...   |  ...   |
       +--------+--------+--------+--------+--------+--------+--------+--------+
#50 => |  ...   |  ...   |  ...   |  ...   |  ...   |  ...   | Z(0)   | Z(1)   |
       +--------+--------+--------+--------+--------+--------+--------+--------+
       | Z(2)   | Z(3)   | Z(4)   | Z(5)   | Z(6)   | Z(7)   | Z(8)   | Z(9)   |
       +--------+--------+--------+--------+--------+--------+--------+--------+
       |  ...   |  ...   |  ...   |  ...   |  ...   |  ...   |  ...   |  ...   |
       +--------+--------+--------+--------+--------+--------+--------+--------+
       |  ...   |  ...   |  ...   |  ...   |  ...   |  ...   |  ...   |  ...   |
       +--------+--------+--------+--------+--------+--------+--------+--------+
       |  ...   |  ...   |  ...   |  ...   | Z(N)   |  ...   |  ...   |  ...   |
       +--------+--------+--------+--------+--------+--------+--------+--------+
       |  ...   |  ...   |   C    |  ...   |  ...   |  ...   |  ...   |  ...   |
       +--------+--------+--------+--------+--------+--------+--------+--------+
       |  ...   |  ...   |  ...   |  ...   |  ...   |  ...   |  ...   |  ...   |
       +--------+--------+--------+--------+--------+--------+--------+--------+
```

```
          26                                      2    1    0
        +-----------------------------------------------------+
        |   |   |   |   | ......|   |   |   |   |   |
        +-----------------------------------------------------+
        |<-------- VERTICAL ------------>|<  PMEM   >|
```

ADDRESS REGISTER

```
             MM0      MM1      MM2      MM3      MM4      MM5      MM6      MM7
          +--------+--------+--------+--------+--------+--------+--------+--------+
IN        | X0(0)  | X1(0)  | X2(0)  | X3(0)  | X4(0)  | X5(0)  | X6(0)  | X7(0)  |
DATA      +--------+--------+--------+--------+--------+--------+--------+--------+
          | X0(1)  | X1(1)  | X2(1)  | X3(1)  | X4(1)  | X5(1)  | X6(1)  | X7(1)  |
          +--------+--------+--------+--------+--------+--------+--------+--------+
          | X0(2)  | X1(2)  | X2(2)  | X3(2)  | X4(2)  | X5(2)  | X6(2)  | X7(2)  |
          +--------+--------+--------+--------+--------+--------+--------+--------+
          |  ...   |  ...   |  ...   |  ...   |  ...   |  ...   |  ...   |  ...   |
          +--------+--------+--------+--------+--------+--------+--------+--------+
          |  ...   |  ...   |  ...   |  ...   |  ...   |  ...   |  ...   |  ...   |
          +--------+--------+--------+--------+--------+--------+--------+--------+
          | X0(N)  | X1(N)  | X2(N)  | X3(N)  | X4(N)  | X5(N)  | X6(N)  | X7(N)  |
          +--------+--------+--------+--------+--------+--------+--------+--------+
          |  ...   |  ...   |  ...   |  ...   |  ...   |  ...   |  ...   |  ...   |
          +--------+--------+--------+--------+--------+--------+--------+--------+
OUT       | Z0(0)  | Z1(0)  | Z2(0)  | Z3(0)  | Z4(0)  | Z5(0)  | Z6(0)  | Z7(0)  |
DATA      +--------+--------+--------+--------+--------+--------+--------+--------+
          | Z0(1)  | Z1(1)  | Z2(1)  | Z3(1)  | Z4(1)  | Z5(1)  | Z6(1)  | Z7(1)  |
          +--------+--------+--------+--------+--------+--------+--------+--------+
          | Z0(2)  | Z1(2)  | Z2(2)  | Z3(2)  | Z4(2)  | Z5(2)  | Z6(2)  | Z7(2)  |
          +--------+--------+--------+--------+--------+--------+--------+--------+
          |  ...   |  ...   |  ...   |  ...   |  ...   |  ...   |  ...   |  ...   |
          +--------+--------+--------+--------+--------+--------+--------+--------+
          |  ...   |  ...   |  ...   |  ...   |  ...   |  ...   |  ...   |  ...   |
          +--------+--------+--------+--------+--------+--------+--------+--------+
          | Z0(N)  | Z1(N)  | Z2(N)  | Z3(N)  | Z4(N)  | Z5(N)  | Z6(N)  | Z7(N)  |
          +--------+--------+--------+--------+--------+--------+--------+--------+

CHANEL:      0        1        2        3        4        5        6        7

26                                          2   1   0
          +-------------------------------------------------------+
          |   |   |   |   |   ......   |   |   |   |   |
          +-------------------------------------------------------+
          |<---------- VERTICAL ------------>|<-  PMEM  ->|
```

ADDRESS REGISTER

FIGURE 5

| PMEM0 | PMEM1 | PMEM2 | PMEM3 | PMEM4 | PMEM5 | PMEM6 | PMEM7 |
|---|---|---|---|---|---|---|---|
| a(0,0) | a(0,1) | a(0,2) | a(0,3) | a(0,4) | a(0,5) | a(0,6) | a(0,7) |
| : | : | : | : | : | : | : | : |
| a(0,16) | a(1,0) | a(1,1) | a(1,2) | a(1,3) | a(1,4) | a(1,5) | a(1,6) |
| a(1,7) | a(1,8) | : | : | : | : | : | : |
| : | a(1,16) | a(2,0) | a(2,1) | a(2,2) | a(2,3) | a(2,4) | a(2,5) |
| a(2,4) | a(2,5) | a(2,6) | a(2,7) | a(2,8) | : | : | : |
| : | : | a(2,16) | a(3,0) | a(3,1) | a(3,2) | a(3,3) | a(3,4) |
| a(3,5) | a(3,6) | a(3,7) | a(3,8) | : | : | : | : |
| : | : | : | a(3,16) | a(4,0) | a(4,1) | a(4,2) | a(4,3) |
| a(4,4) | a(4,5) | a(4,6) | a(4,7) | a(4,8) | : | : | : |
| : | : | : | : | a(4,16) | a(5,0) | a(5,1) | a(5,2) |
| a(5,3) | a(5,4) | a(5,5) | a(5,6) | a(5,7) | a(5,8) | : | : |
| : | : | : | : | : | a(5,16) | a(6,0) | a(6,1) |
| a(6,2) | a(6,3) | a(6,4) | a(6,5) | a(6,6) | a(6,7) | a(6,8) | : |
| : | : | : | : | : | : | a(6,16) | a(7,0) |
| a(7,1) | a(7,2) | a(7,3) | a(7,4) | a(7,5) | a(7,6) | a(7,7) | a(7,8) |
| : | : | : | : | : | : | : | a(7,16) |
| : | : | : | : | : | : | : | : |

|  PMEM0  |  PMEM1  |  PMEM2  |  PMEM3  |  PMEM4  |  PMEM5  |  PMEM6  |  PMEM7  |
|---------|---------|---------|---------|---------|---------|---------|---------|
| a(0,0)  | a(0,1)  | a(0,2)  | a(0,3)  | a(0,4)  | a(0,5)  | a(0,6)  | a(0,7)  |
| a(0,8)  |   :     |   :     |   :     |   :     |   :     |   :     | a(0,15) |
| ////    | a(1,0)  | a(1,1)  | a(1,2)  | a(1,3)  | a(1,4)  | a(1,5)  | a)1,6)  |
| a(1,7)  | a(1,8)  |   :     |   :     |   :     |   :     |   :     |   :     |
| a(1,15) | ////    | a(2,0)  | a(2,1)  | a(2,2)  | a(2,3)  | a(2,4)  | a(2,5)  |
| a(2,4)  | a(2,5)  | a(2,6)  | a(2,7)  | a(2,8)  |   :     |   :     |   :     |
|   :     | a(2,15) | ////    | a(3,0)  | a(3,1)  | a(3,2)  | a(3,3)  | a(3,4)  |
| a(3,5)  | a(3,6)  | a(3,7)  | a(3,8)  |   :     |   :     |   :     |   :     |
|   :     |   :     | a(3,15) | /////   | a(4,0)  | a(4,1)  | a(4,2)  | a(4,3)  |
| a(4,4)  | a(4,5)  | a(4,6)  | a(4,7)  | a(4,8)  |   :     |   :     |   :     |
|   :     |   :     |   :     | a(4,15) | ////    | a(5,0)  | a(5,1)  | a(5,2)  |
| a(5,3)  | a(5,4)  | a(5,5)  | a(5,6)  | a(5,7)  | a(5,8)  |   :     |   :     |
|   :     |   :     |   :     |   :     | a(5,15) | ////    | a(6,0)  | a(6,1)  |
| a(6,2)  | a(6,3)  | a(6,4)  | a(6,5)  | a(6,6)  | a(6,7)  | a(6,8)  |   :     |
|   :     |   :     |   :     |   :     |   :     | a(6,15) | ////    | a(7,0)  |
| a(7,1)  | a(7,2)  | a(7,3)  | a(7,4)  | a(7,5)  | a(7,6)  | a(7,7)  | a(7,8)  |
|   :     |   :     |   :     |   :     |   :     |   :     | a(7,15) | ////    |
|   :     |   :     |   :     |   :     |   :     |   :     |   :     |   :     |

```
  26                                              0
 +------------------------------------------------+
 | | | | * * * * * | | | |
 +------------------------------------------------+
 |<------ VERTICAL -------->|< PMEM >|
```

FIGURE 6b.

```
           PMEM0    PMEM1    PMEM2    PMEM3    PMEM4    PMEM5    PMEM6    PMEM7
         +--------+--------+--------+--------+--------+--------+--------+--------+
BA =>    | X(0)   | X(1)   | X(2)   | X(3)   | X(4)   | X(5)   | X(6)   | X(7)   |
 X       +--------+--------+--------+--------+--------+--------+--------+--------+
         |   :    |   :    |   :    |   :    |   :    |   :    |   :    |   :    |
         +--------+--------+--------+--------+--------+--------+--------+--------+
BA =>    | a(0,0) | a(0,1) | a(0,2) | a(0,3) | a(0,4) | a(0,5) | a(0,6) | a(0,7) |
 A       +--------+--------+--------+--------+--------+--------+--------+--------+
         | ////   | a(1,0) | a(1,1) | a(1,2) | a(1,3) | a(1,4) | a(1,5) | a)1,6) |
         +--------+--------+--------+--------+--------+--------+--------+--------+
         | a(1,7) | ////   | a(2,0) | a(2,1) | a(2,2) | a(2,3) | a(2,4) | a(2,5) |
         +--------+--------+--------+--------+--------+--------+--------+--------+
         | a(2,6) | a(2,7) | ////   | a(3,0) | a(3,1) | a(3,2) | a(3,3) | a(3,4) |
         +--------+--------+--------+--------+--------+--------+--------+--------+
         | a(3,5) | a(3,6) | a(3,7) | /////  | a(4,0) | a(4,1) | a(4,2) | a(4,3) |
         +--------+--------+--------+--------+--------+--------+--------+--------+
         | a(4,4) | a(4,5) | a(4,6) | a(4,7) | /////  | a(5,0) | a(5,1) | a(5,2) |
         +--------+--------+--------+--------+--------+--------+--------+--------+
         | a(5,3) | a(5,4) | a(5,5) | a(5,6) | a(5,7) | ////   | a(6,0) | a(6,1) |
         +--------+--------+--------+--------+--------+--------+--------+--------+
         | a(6,2) | a(6,3) | a(6,4) | a(6,5) | a(6,6) | a(6,7) | ////   | a(7,0) |
         +--------+--------+--------+--------+--------+--------+--------+--------+
         |a(7,1)  | a(7,2) | a(7,3) | a(7,4) | a(7,5) | a(7,6) | a(7,7) | /////  |
         +--------+--------+--------+--------+--------+--------+--------+--------+
         |   :    |   :    |   :    |   :    |   :    |   :    |   :    |   :    |
         +--------+--------+--------+--------+--------+--------+--------+--------+
BA =>    | Y(0)   | Y(1)   | Y(2)   | Y(3)   | Y(4)   | Y(5)   | Y(6)   | Y(7)   |
 Y       +--------+--------+--------+--------+--------+--------+--------+--------+
```

CYCLE 1
    GLOBAL READ X(0) ==> PE0 , PE1 .... PE7

CYCLE 2
    READ        a(0,0) , a(1,0) , a(2,0) ..... a(7,0)
                [PMEM0]  [PMEM1]  [PMEM2]     [PMEM7]
                  |        |        |           |
                  v        v        v           v
                 PE0      PE1      PE2         PE7

CYCLE 3
    GLOBAL READ X(1) ==> PE0 , PE1 .... PE7

CYCLE 4
    READ        a(0,1) , a(1,1) , a(2,1) ..... a(7,1)
                [PMEM1]  [PMEM2]  [PMEM3]     [PMEM0]
                  |        |        |           |
                  v        v        v           v
                 PE0      PE1      PE2         PE7 etc

FIGURE 6c.

|         | PMEM0   | PMEM1   | PMEM2   | PMEM3   | PMEM4   | PMEM5   | PMEM6   | PMEM7    |
|---------|---------|---------|---------|---------|---------|---------|---------|----------|
|         | x(0,0)  | x(0,1)  | x(0,2)  | x(0,3)  | x(0,4)  | x(0,5)  | x(0,6)  | x(0,7)   |
|         | :       | :       | :       | :       | :       | :       | :       | :        |
|         | :       | :       | :       | :       | :       | :       | :       | x(0,31)  |
|         | x(1,0)  | x(1,1)  | x(1,2)  | x(1,3)  | x(1,4)  | x(1,5)  | x(1,6)  | x(1,7)   |
|         | :       | :       | :       | :       | :       | :       | :       | :        |
|         | :       | :       | :       | :       | :       | :       | :       | x(1,31)  |
|         | :       | :       | :       | :       | :       | :       | :       | :        |
|         | :       | :       | :       | :       | :       | :       | :       | :        |
|         | x(31,0) | x(31,1) | x(31,2) | x(31,3) | x(31,4) | x(31,5) | x(31,6) | x(31,7)  |
|         | :       | :       | :       | :       | :       | :       | :       | :        |
|         | :       | :       | :       | :       | :       | :       | :       | x(31,31) |

|<------ VERTICAL ------>|< PMEM >|

HIGHLY PARALLEL COMPUTER ARCHITECTURE EMPLOYING CROSSBAR SWITCH WITH SELECTABLE PIPELINE DELAY

This is a continuation-in-part of U.S. application Ser. No. 117,564, filed Nov. 6, 1987, now abandoned.

BACKGROUND OF THE INVENTION

1. Field of the Invention

The present invention relates to a crossbar switch for a moderately high speed (100 nsec) coarse grain parallel processing computer node having a performance in the supercomputing range.

2. Description of the Related Art

Supercomputers are typically defined as computers capable of executing at least 100 million floating point operations per second (MFLOPS) and providing memory transfer rates of several 10's of MWORDS per second. Conventional supercomputers, such as the Cray supercomputer, achieve this phenomenal performance by using an extremely fast clock, on the order of 4 ns per cycle. Unfortunately, a high-speed clock generates a considerable amount of heat which requires that such supercomputers remain submerged in liquid for cooling purposes. The design of conventional supercomputers also requires a large physical size for housing large amounts of hardware, thus occupying typically a small room. Accordingly, such supercomputers are essentially limited to laboratory applications. Many present-day militarized and ruggedized applications require computational throughput rates in the supercomputer range and their requirements can not be satisfied by today's standard commercial supercomputers.

SUMMARY OF THE INVENTION

The present invention overcomes the forementioned drawbacks by the provision of a novel crossbar switch which allows N ($N=2^k$; $k=0,1,2,3$) coarse grain parallel processing elements (PEs) to communicate with a plurality of parallel memories (PMEMs) in one clock cycle (100 nsec). The plurality of PMEMs is usually equal to the number of PEs. However, when the system needs to operate in a degraded mode, the number of PMEMs may be twice as many as the number of PEs. The PEs, each capable of providing 20 million floating point operations per second, (MFLOPS), 10 million logical operations per second (MLOPS), as well as generating 10 million fetch or write addresses per second, can be configured into a variety of different processing nodes; 20, 40, 80 or 160 MFLOPS. A large spectrum of algorithms requiring a variety of data transfer patterns between PEs and PMEMs can be handled optimally with the selectable pipeline delay crossbar switch of the present invention.

The configuration of the crossbar switch, (i.e. the connection between each floating point arithmetic PE unit and each PMEM module) may be changed dynamically on a cycle-by-cycle basis in accordance with the needs of the algorithm being executed. Although there are certain crossbar usage rules which must be obeyed, for a given algorithm, each PE unit can fetch from PMEM, operate on an input data stream and write back to PMEM in a highly parallel fashion producing a performance comparable to present-day supercomputers. A unique mapping of different data types (i.e. scalars, vectors and matrices) across PMEM in conjunction with the use of the proposed crossbar switch provides for very efficient and flexible data transfers between PEs and PMEMs that are free of communication bottlenecks. The crossbar switch is comprised of two basic sections: a multiplexer and a control section. The multiplexer provides the actual switching of signal paths, i.e., connects each PE unit to a particular PMEM on any clock cycle (100 nsec). The control section determines which connections are made on each clock cycle in accordance with the algorithm under execution. A selectable pipeline delay in the circuitry of the control section which produces a variety of interlaced patterns of memory reads and writes over a parallel bidirectional data bus provides for an optimal data transfer between the PEs and PMEM modules over a wide range of array processing algorithms. The highly parallel architecture of the present invention allows true supercomputer performance to be achieved with a clock rate which runs at a conventional PC rate of 100 ns per cycle. Thus, the supercomputing power of the present invention does not generate excessive heat during operation and may be air cooled and ruggedized quite readily.

The unique architecture of the present invention employs "off the shelf" components arranged in a stand alone unit of about one-third the size of conventional supercomputers. This feature, along with air cooling, allows the supercomputing power of the present invention to be used in a variety of applications outside the laboratory heretofore impossible with any other commercially available supercomputers. The highly parallel structure of the invention in conjunction with the crossbar switch allows most component failures to be bypassed by reconfiguring the processing node to a system configuration of a lesser size (i.e. $2^{(K-1)}$; $k=3,2,1$). This degradation to a lower computing node does not require the downloading of new microcode since the microcode is written to be totally upward compatible on a 1, 2, 4, or 8 PE system Degradation to a lesser size computational node does not necessitate that the system degrade the number of parallel memories.

These and other features and advantages are described below, with reference to the accompanying drawings.

BRIEF DESCRIPTION OF THE DRAWINGS

FIG. 3 shows a diagram on the addressing of parallel memory.

FIG. 5 shows memory mapping of input and output data for a multichannel recursive filtering.

FIGS. 6a and 6b show a mapping diagram of odd and even matrices in parallel memory.

FIG. 6c illustrates a memory mapping of a vector-matrix multiply.

DETAILED DESCRIPTION OF THE PREFERRED EMBODIMENT

I. Introduction: Overall Architecture and Principles of Operation

Figure 1:
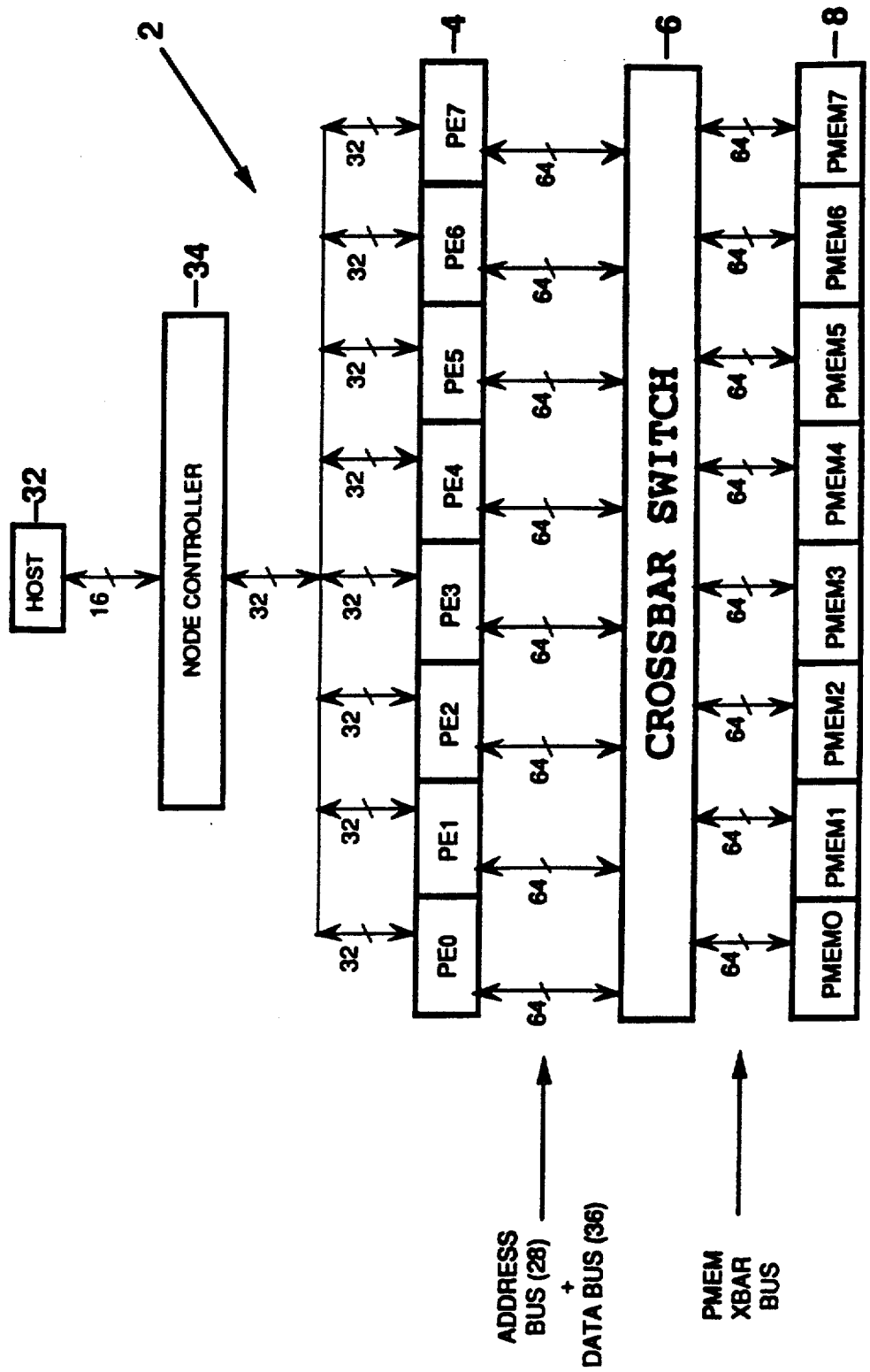
FIG. 1 shows the overall system architecture of a parallel processing 160 MFLOPS node.

FIG. 1 illustrates the overall system architecture of a processing node, identified generally by reference numeral 2. N (up to 8) coarse grain processing element units (PEs) 4 are connected through a crossbar switch (XBAR) 6 to an equal number of parallel memories (PMEMs) 8. The crossbar switch 6 of the present invention, described in further detail below, advantageously allows any PE to be connected to any PMEM on any clock cycle (100 nsec).

Figure 2A:
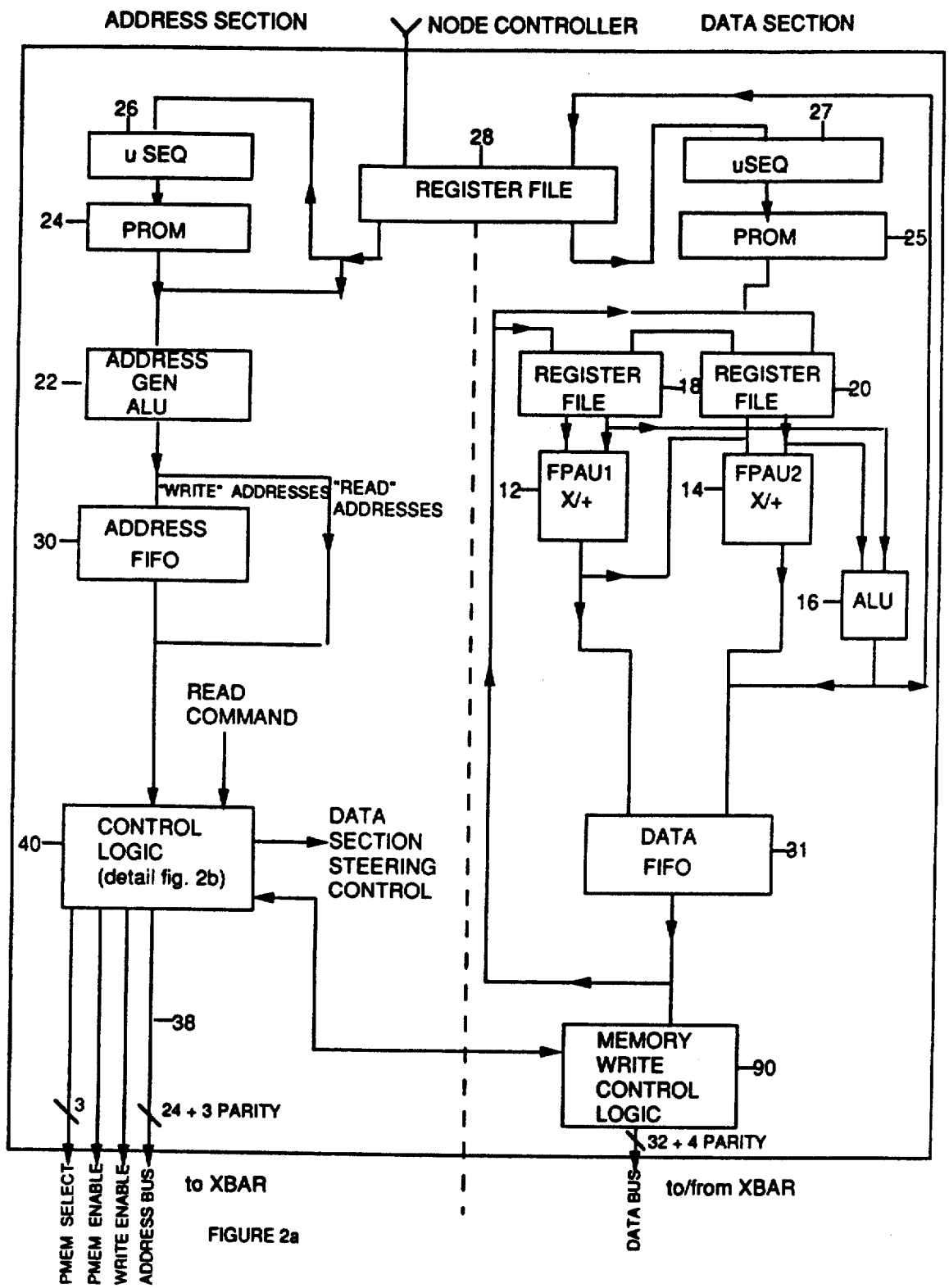
FIG. 2a shows a block diagram of a processing element (PE).

Each processing node 2 is constructed modularly to allow for the computational throughput to range from 20 to 160 MFLOPS. Each PE consists of a DATA SECTION and an ADDRESS SECTION (FIG. 2a). The DATA SECTION includes 2 arithmetic floating point multiplier/adder units (FPAUs) 12, 14 which can produce either a product or sum, a float-to-fix or fix-to-float conversion on any clock cycle (100 nsec), thus providing 20 MFLOPS per PE. The DATA SECTION also contains a 32 bit ALU 16 rated at 10 million logical operations per second (MLOPS) which can be used in generating addresses for data dependent algorithms (e.g. trigonometic lookup table primitives). A flexible internal bus architecture allows for further parallelism (e.g. calculating sums of products for matrix multiply). A pair of 2 input 2 output register files 18, 20 (having a total of 128 registers) provides a very flexible crossbar effect on the 2 FPAUs. The ADDRESS SECTION contains a 32 bit ALU address generator 22 capable of providing 10 million data addresses per second (reads or writes to parallel memory).

All PEs run synchronously on one 10 MHz clock. Each PE has its own address and data microcode resident in its own separate PROM 24, 25. Each PE also has its own separate address and data microsequencers 26, 27 with branch control inputs which allow each PE to operate independently in primitives having data dependent code. For other primitives (e.g. vector vector add), the microcode in each PE operates in lockstep (except for differences in starting addresses and loop counts). Macro commands are placed in an input register file 28 shared by both the address and data sections which allows each section to commence the execution of the microcode. Communication between the DATA and ADDRESS SECTIONS occur through register file 28. The microcode primitives that run on the system involve a very long instruction width (VLIW) field of 400 control bits per PE. The address and data FIFOs 30, 31 allow data to be generated before or after the corresponding addresses have been generated. This feature makes programming of each section much easier. The crossbar design and complementary microcode programming techniques to be described allow for a single microcode program to function properly, without changes, on any configuration of the node from 20 MFLOPS to 160 MFLOPS. In addition, it provides for graceful degradation of the system without having to reload a different program.

When all PEs are concurrently performing floating point operations at their peak rates, a total system throughput of 160 MFLOPS and 80 million instructions per second (MIPS) can be achieved. In practice, the number of floating point operations performed is dependent on the algorithm being executed. For example, the vector scalar multiply algorithm, which transfers data to and from memory at the peak rate of 80 million words per second (100% data transfer efficiency), requires an arithmetic throughput of only 40 MFLOPS. As a second example, a convolution algorithm transfers data to and from memory at 80 MWORDS/SEC (100% of its Memory Transfer) and in addition it also performs floating point arithmetic at nearly 100% of its peak MFLOP rating (8 sums of products on every clock cycle). For most algorithms (e.g. digital signal processing or image processing), full utilization of the memory transfer bandwidth is achieved, and around 70% of the peak computational throughput power is used.

A computational node 2 such as that illustrated in FIG. 1 can be integrated with any host running on UNIX ™. The user can program this machine from a UNIX host 32 using a flowgraph based application programming system. A machine-readable description of the user's flowgraph program is then downloaded to the node controller 34 (FIG. 1), which generates a sequence of macro execution commands to the PEs. For dedicated applications, the programs can be burned into the local PROM space and run as a host-free unit.

The node controller executive 34 monitors and schedules tasks within each node and coordinates the input and output of data from a node to and from the host 32. Node controller 34 can schedule up to 50,000 tasks per second; thus the supercomputing power of the node is not prone to task control bottlenecks.

The processor of the present invention achieves its high performance over a wide range of signal processing algorithms through the use of a novel crossbar switch (XBAR). The XBAR allows each of up to 8 PEs to extend their address, data and read/write control buses to any one of up to 8 different memory modules (PMEM's). The memory selected by any individual PE can be changed dynamically on a cycle-by-cycle basis. Normally, no more than one PE can read from or write to the same memory during the same bus transfer cycle. However, all PEs may read from the same address of any single memory during what is referred to as a "broadcast read" cycle. This particular mode provides a very efficient way for solving matrix oriented algorithms. In order to avoid memory clash, the signal processing algorithms must be programmed so that these rules are not violated.

The storing of data (e.g. scalars, vectors, matrices and multidimensional arrays) can be mapped into the multiple PMEMs in a variety of different ways. Different mapping strategies are employed which provide for optimum data transfer rates. The present crossbar invention supports many memory mapping modes as discussed in further detail below. Memory selection into PMEM is accomplished by decoding the three least significant bits of the address output from each of the PEs. FIG. 3 illustrates the addressing of PMEM. Each of the eight columns represents a different physical memory, and the number inside each cell of any column is the address value required to access that cell of memory. If all 8 PEs are concurrently performing a memory access (other than a broadcast read, described above), the three LSB's of their respective output addresses must all be unique in order to obey the crossbar usage rule.

Figure 4:
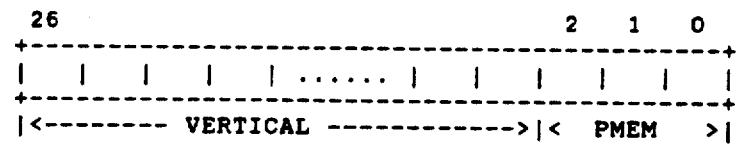
FIG. 4 shows a mapping diagram of a scalar and several vectors in parallel memory (PMEM).

The mapping of scalars and vectors into parallel memory is illustrated in FIG. 4. The scalar quantity C has been mapped arbitrarily in PMEM2 (FIG. 4). Usually scalar quantities are read by all PEs in one clock cycle during the initialization part of an algorithm (e.g. vector scalar multiply). Global reads from memory are accomplished by having the address register of all PEs contain the same 27 bit pattern. Global reads from memory are also important in matrix algorithms, where one row element can simultaneously operate on several column terms (row element times multiple column element multiplication). As for the mapping of vectors, in most cases they are distributed across all memories and their first element (e.g. X(O), Y(O), and Z(O)) can be arbitrarily mapped anywhere in PMEM. This mapping technique is referred to as distributed vector memory mapping. One can move from any particular memory to the next vertical location by incrementing the 27 bit address by 0000 . . . 1000 (1 vertical bit). Horizontal movement, that is, selection of a different PMEM, is achieved by modifying the 3 LSB. More details on addressing PMEM are presented later. It should be noted that for vectors, more than one PE cannot concurrently access vector elements which are vertically displaced from one another. As described later, distributed vector mapping provides for a 100% memory transfer bandwidth for the execution of typical algorithms such as the vector-vector add and vector-scalar add. It is worth noting that vectors can also be mapped vertically (see FIG. 5), in which all elements of the vector are located in the same PMEM. This mapping technique is referred to as channellized vector mapping. For instance, there are some algorithms which do not lend themselves to be parallelized (e.g. recursive filtering), and consequently it is more expedient to have several processors compute such filtering operations as independent processors on independent columns of data stored separately in distinct physical memories.

Figure 6A:
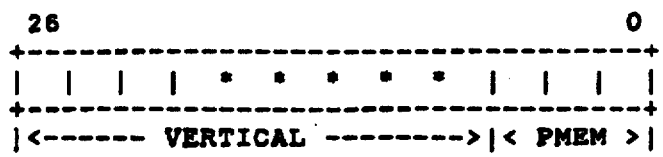

As for the mapping of two dimensional arrays (matrices), FIGS. 6a and 6b illustrate the most common way in which real matrices can be mapped onto an 8 PMEM system. FIG. 6a illustrates the mapping of an odd column matrix (8×17) and FIG. 6b illustrates the mapping of an even column matrix (8×16). Matrices are mapped across our PMEM in a row wise manner. When all elements of a row are exhausted, the next row mapping is commenced. For the odd column matrix illustrated in FIG. 6a, the first element of contiguous rows is mapped in distinct PMEMs. This is always the case for odd column matrices, and it provides for great flexibility in handling both row and column elements. For instance, on any clock cycle, the fetching or writing of any 8 contiguous elements in a row by 8 PEs (e.g. a(0,0), a(0,1), a(0,2) , . . . a(0,7)) creates no memory clash because all contiguous row elements always happen to be mapped to be mapped on distinct memories. Similarly, fetching or writing to contiguous elements in a column (e.g. a(0,0), a(1,0), a(2,0), a(3,0) , . . . a(7,0) are also observed to be mapped on distinct thus producing no memory clash. Thus, the mapping of odd column matrices in the system of the present invention provides for great parallelism in the manipulation of both columns and rows. This result provides for great flexibility in the programming of matrix algorithms which require transposition operations. This mapping technique is also used in the mapping of even column matrices. Even column matrices are mapped in PMEM as if they were odd column matrices, with one dummy odd row element appended after each last row entry (see FIG. 6b). This mapping is completely handled by node controller 34 and is transparent to the user. Thus, even column matrix illustrated in FIG. 6b provides the same flexibility in addressing both rows and columns elements as that described in FIG. 6a. The dummy elements are never included in any matrix calculations and therefore they do not affect the results. FIG. 6c illustrates the flexibility this mapping technique offers in solving problems such as a vector matrix multiply (e.g.

$$\sum_i X_i A_{ik} = Y_k).$$

A vector X of 8 elements multiplies an 8×8 A matrix to produce an 8 element Y vector (e.g. (1×8)(8×8)=(1×8)). This problem can be solved by computing simultaneously 8 sums of products of the given X vector with the 8 distinct 8 columns of the A matrix. A global read of a given row elements into 8 distinct PEs provides for one input operand on one cycle whereas distinct fetches to 8 contiguous matrix row element provides for the next operand on alternate cycles. Since contiguous row elements have been shown to reside in distinct PMEMs, no memory clashes can ever occur for either even or odd column matrices.

Figure 7:
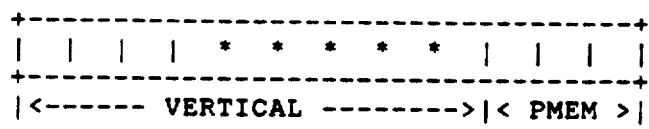
FIG. 7 shows memory mapping of a 32×32 digital image.

For many digital image processing applications, where the images have horizontal dimensions that are multiples of 8, it is more convenient to map the image across PMEM as contigous rows without utilizing the dummy spaces used for matrix algorithms. For instance, the threshold and replace operation on pixel elements of an image can be parallelized quite readily if the image is mapped as illustrated in FIG. 7. For this particular problem, the crossbar switch is effectively locked and each PE searches through its own PMEM for pixel values exceeding a predetermined value. Pixel values exceeding this value are replaced by the threshold value. This image processing application can be thought of as a bunch of asynchronous PEs executing their own particular codes. Since a threshold replacement operation involves a write to PMEM usually requiring additional microcycles, each separate PE usually operates out of lockstep with the rest of the other PEs.

A more detailed description on how the crossbar and microcode utilize distinct pipeline delays as a means to optimize memory transfer between PEs and PMEMs is set forth in Section III below.

II. HARDWARE DESCRIPTION

A crossbar switch is a $N^2$ interconnection network which allows N PEs to communicate simultaneously with N memories. The switch consists of two sections; a multiplexer and a control section.

The multiplexer section does the actual switching of signal paths. In general, there is a path from every device into the switch. The configuration of the switch determines which pairs of devices (i.e., which PMEM and PE) will be connected. In a true crossbar, all connections are possible.

The control section of the switch determines which connections are made at any one time. Each PE provides its own portion of the control field to the crossbar switch on every memory access cycle. The set of all of the PE control fields determines the configuration of the switch during any given memory access cycle. The crossbar switch configuration is, therefore, predetermined at the time that the PE microcode algorithms are developed. This approach eliminates the need for arbitration of access to PMEM's during run time, thereby allowing the crossbar switch to operate at or near 100% efficiency.

The architecture of the XBAR achieves the following performance characteristics:

(i) Speed: The XBAR takes less than one clock cycle to set up and pass one piece of data on every bus.

(ii) Flexibility: The XBAR is able to be switched on each clock cycle.

(iii) Fall-through Design: the XBAR does not add a pipeline stage to the architecture.

(iv) Expandibility: The XBAR is able to handle a variety of combinations of PEs and PMEM's (e.g. 8 PMEMS 8 PES, 4 PMEMS 4 PES, etc).

(v) Fault tolerance: The XBAR is able to handle degraded systems (e.g. 4 PES 8 PMEMS, etc).

(vi) Modularity: The XBAR is made of regular building blocks which can be easily interconnected.

(vii) Ruggedness: The XBAR is able to pass military hardware specifications.

(viii) Cost Effective: The XBAR is small and easy to produce.

In the preferred embodiment, XBAR is comprised entirely of "off the shelf" parts and uses only two printed circuit designs. One design is a backplane (mother board) and the other is a daughter board. Although only three sizes of XBAR are discussed hereinafter, the design concept is obviously much more general.

The crossbar size is referenced by three numbers. The first number is the number of PEs in a system. The second is the number of PMEMs and the third is the number of bits carried on each bus. In the preferred embodiment described below, XBAR is an 8×8×64 crossbar connecting 64 signals from 8 PEs to 8 PMEM's.

Figure 8:
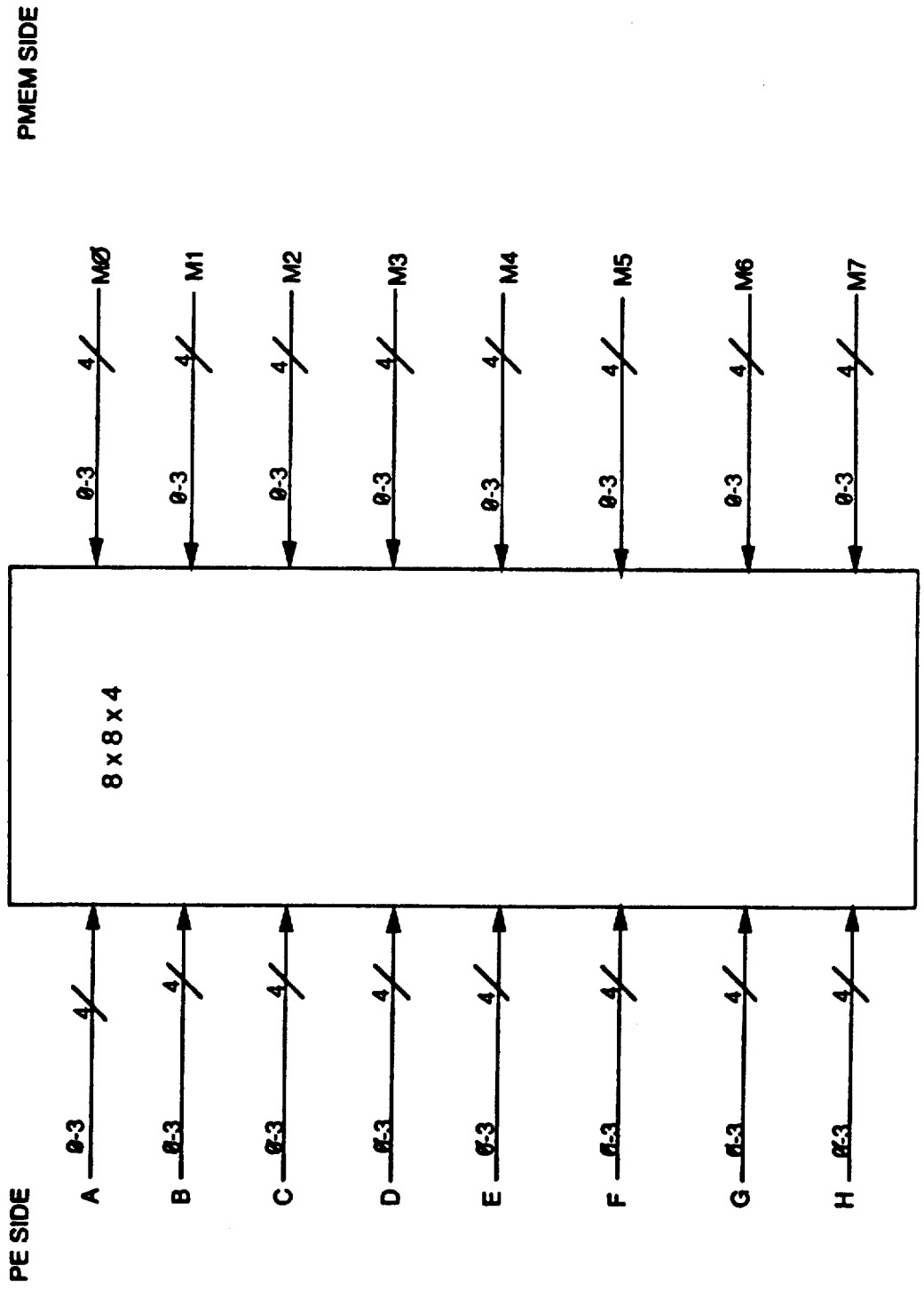
FIG. 8 shows the design of an 8×8×4 crossbar of the present invention.
Figure 9:
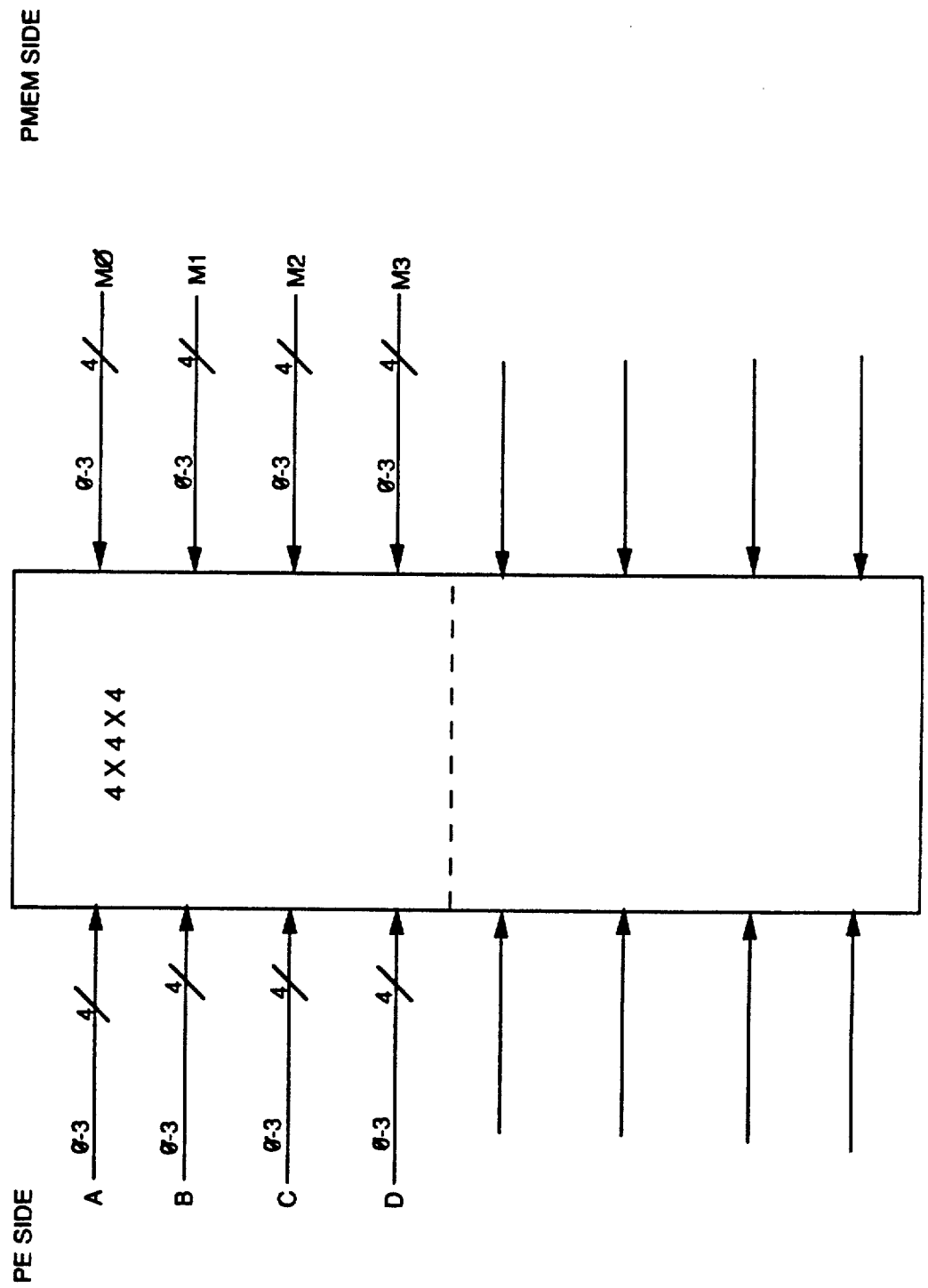
FIG. 9 shows the use of half of an 8×8×4 card of FIG. 7 to form a 4×4×4 card.
Figure 10:
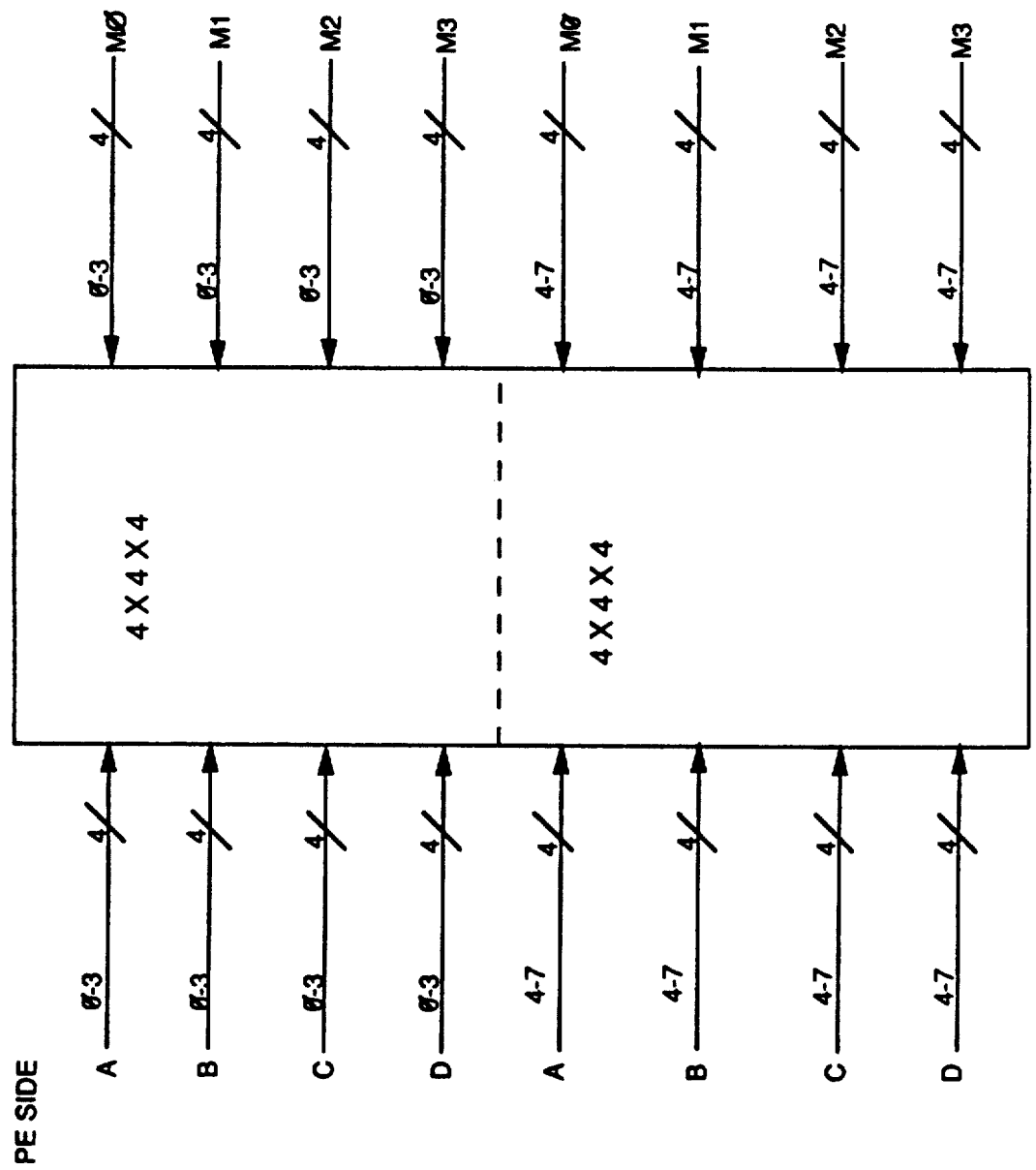
FIG. 10 shows the combination of two 4×4×4 cards of FIG. 8 to form a 4×4×8 card.

The daughter board design actually comprises a miniature of the crossbar section itself. It can be characterized as an 8×8×4 bit crossbar connecting eight PE buses of four bits each to eight PMEM buses of four bits each (FIG. 8). The total number of signals in and out of the multiplexer section of this card is 64 signals. As discussed later, all signals are ECL 10K differential so a signal requires two wires. The daughter board also receives 40 control signals. There are five bits of control for each of the eight buses (three bits of PMEM select, one bit of PMEM enable and one bit for direction control). By "stacking" 16 of these cards in parallel, an 8×8×64 bit crossbar can be achieved in much the same way that a 64 bit wide memory may be built of 1, 4 or 8 bit wide memory devices. A set of 16×8×4 bit daughter cards is more than sufficient for a 4×4 crossbar. Only 4 of the 8 FPAU connections and 4 of the 8 PMEM connections will be used. In such a configuration, the other connections will be wasted (FIG. 9). However, those other connections need not be wasted. The upper half of the 8×8 multiplier section is being used as a 4×4 multiplexer. The lower half could also be used as a 4×4 multiplexer. Thus, the 8×8×4 card can also function as two 4×4×4"cards". It can be thought of as a 4×4×8 card because there are 4 FPAU buses, 4 PMEM buses and eight bits being carried on each bus (FIG. 10).

Figure 11:
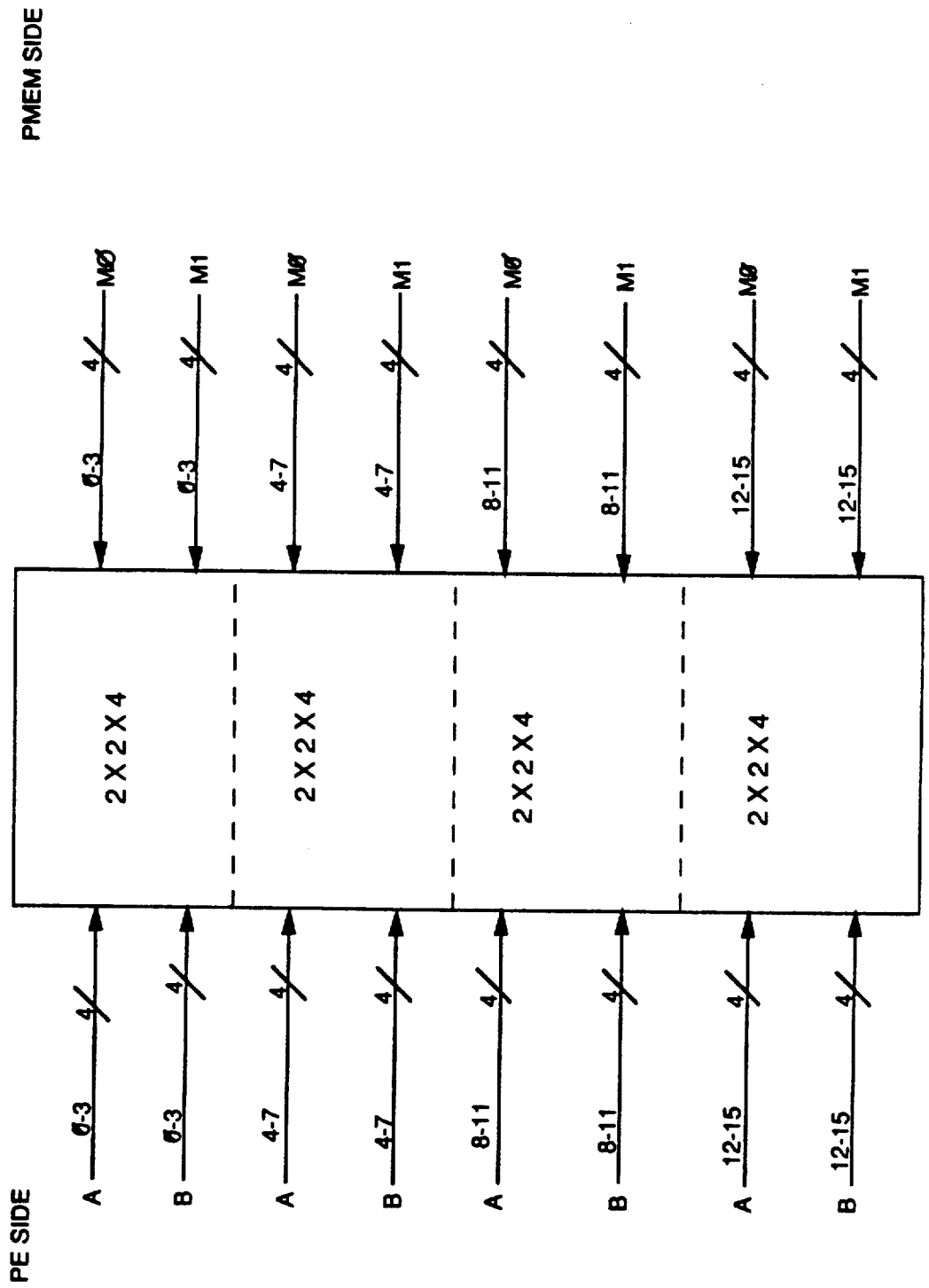
FIG. 11 shows how and 8×8×4 card of FIG. 7 can be made to function as a 2×2×16 card.

Similarly, an 8×8×4 card can be made to function as a 2×2×16 card (FIG. 11). In fact, the 8×8×4 card, if properly designed, can function as a 16×16×2 card or a 32×32×1 card; even larger switches are possible. The only limitations are physical: the size of the card, the number of logic devices required and the number of I/O connector pins available. As the number of buses increases, the number of control lines required increases, while the signal lines remains constant:

|  | Signal Lines | Minimum # of Control Lines Required* |
| --- | --- | --- |
| 2 × 2 × 16 | 64 | 6 |
| 4 × 4 × 8 | 64 | 16 |
| 8 × 8 × 4 | 64 | 40 |
| 16 × 16 × 2 | 64 | 96 |
| 32 × 32 × 1 | 64 | 224 |
| 64 × 64 × 1 | 128 | 512 |

*N × N × M requires Nlog2(N) select signals + 2 × N control signals

The 64 bits of information that pass through the multiplexer portion of XBAR contain: 32 bits of data, 4 bits of byte-wise data parity, 24 bits of vertical address, 3 bits of byte-wise address parity, and 1 bit of pipeline control. The 64 bits are sent as ECL 10K differential signals. They are carried by eight 20 conductor twisted-pair ribbon cables from each PE to the XBAR and over an equal number of cables from the XBAR to the PMEMs. The 36 bits of data and parity are bidirectional, allowing each PE to read or write to its selected PMEM. The 27 bits of vertical address are unidirectional, flowing from the PEs to the PMEMs. The XBAR cards carrying the address bits are identical to all the others but their direction controls are not exercised.

Each PE sends a number of control signals 38 to the XBAR (see FIG. 2a). These are: the 3 horizontal address bits that select which PMEM the PE is accessing (the steering vector), 1 write enable and 1 PMEM enable bit.

These signals must be operated on differently depending on whether a read, a write, or a broadcast read is being performed. If a PE is writing to a PMEM, the data, address and control information all flow through the XBAR simultaneously, in the same direction and all in one clock cycle, and both PMEM enable and write enable are active. If a PE is reading from a PMEM, the address and control signals flow toward the PMEM in one clock cycle, and only PMEM enable is active. Several clock cycles later the data flows back from the PMEM. The crossbar is designed so when that data is flowing back, XBAR is properly configured to get the data to the right PE. A broadcast read (same data to all PE's) operates similar to a normal read, except that only the PE designated as "master" (in its configuration register) generates the PMEM select and controls the Address Bus.

There is a control circuit in the XBAR for each PE. During a read operation, this circuit delays the memory select signals to only the cards handling the 36 bits of data and parity. This delay matches the initial read access delay of the PMEM section. When the data from the PMEM enters XBAR, the control circuits set the path back to the proper FPAU. So, during read operations, the "data" cards in XBAR function independently from the "address" cards. Consequently, there are two sets of control signals developed, one for "address" XBAR cards and one for "data" XBAR cards.

Figure 12:
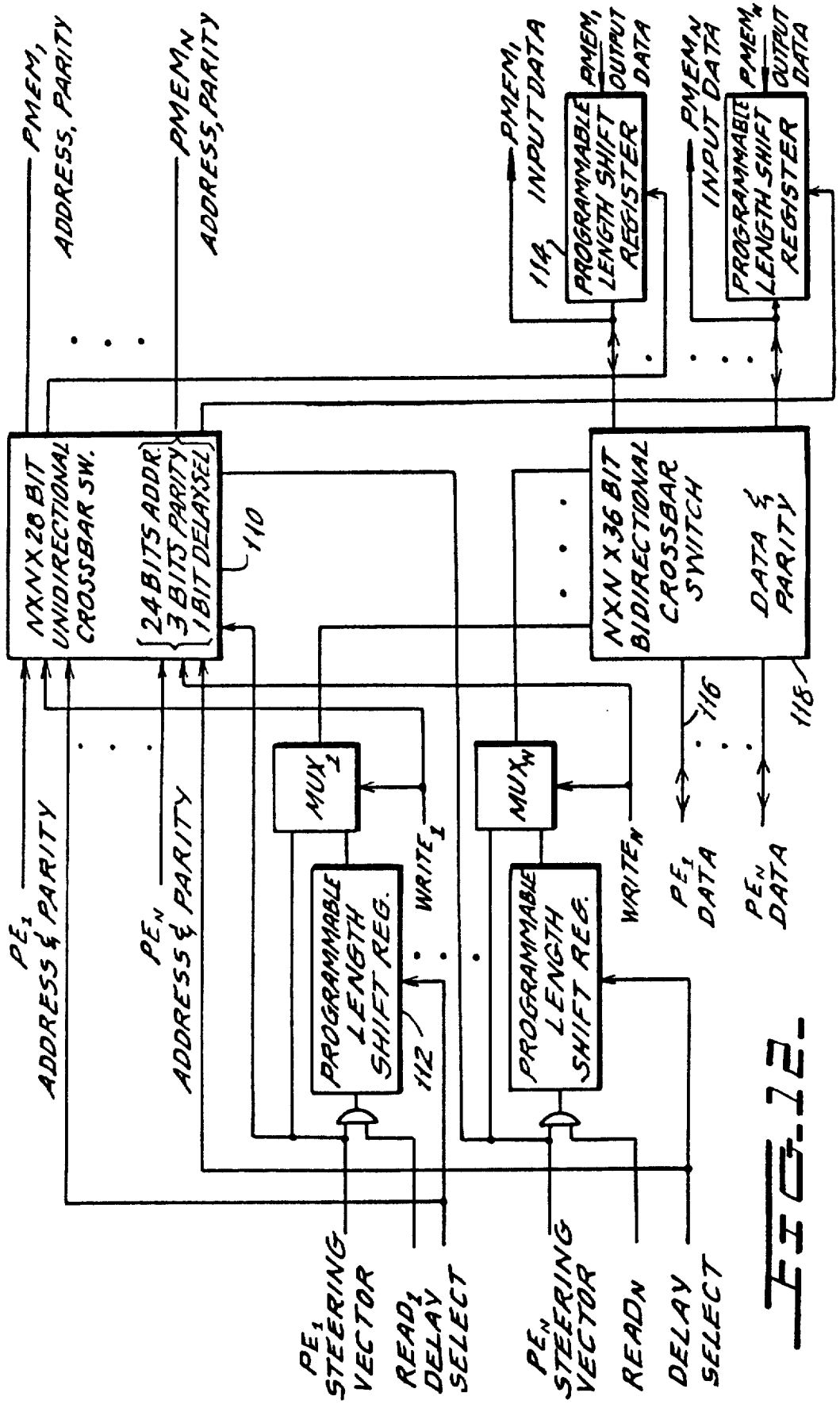
FIG. 12 shows the pipelining hardware of the control circuitry for the crossbar switch.

Referring to FIG. 12, when a unit PE reads data from a selected PMEM, a programmable selectable delay of either four or six instruction cycles is interposed between the transfer of the memory address over the crossbar address bus to PMEM, and the subsequent transfer of PMEM output data over the crossbar data bus to the PE. As described above, the four cycle delay is designed to match the minimum access time of the PMEM circuit and to allow interlaced patterns of reads and writes which are repetitious every four clock cycles. The six cycle delay allows interlaced patterns of reads and writes which are repetitious every six clock cycles. Note that this technique may be extended to cases where the minimum PMEM access time is either greater than or less than four clock cycles. For example, for PMEMs with access times of two clock cycles, the appropriate selectable delays would be either two or three clock cycles. To utilize the XBAR design, however, the PMEM cards must be designed to allow pipelined operation, that is, read and write commands will be responded to on each clock cycle, even if the last read or write command has not been completed. The crossbar steering vector PMEM SELECT (the 3 LSB of the address), which is provided by the PE along with the memory address (and parity), is initially sent through the uni-directional XBAR address cards 110 to select the proper PMEM module. During a read operation, the steering vector is also saved in a programmable length shift register 112 which provides the variable pipeline delay for subsequent steering of the memory output data to the requesting PE after the selected number of instruction cycle delays (either four or six) have elapsed. If a six cycle delay is selected, then two additional delay cycles must be added by programmable length shift register 114 to the data returning from memory (four delays are inherent, as set forth in FIG. 12 and the discussion which follows). Both data written into memory and read from memory passes across bidirectional bus 116 and through bidirectional crossbar switch 118.

Figure 13:
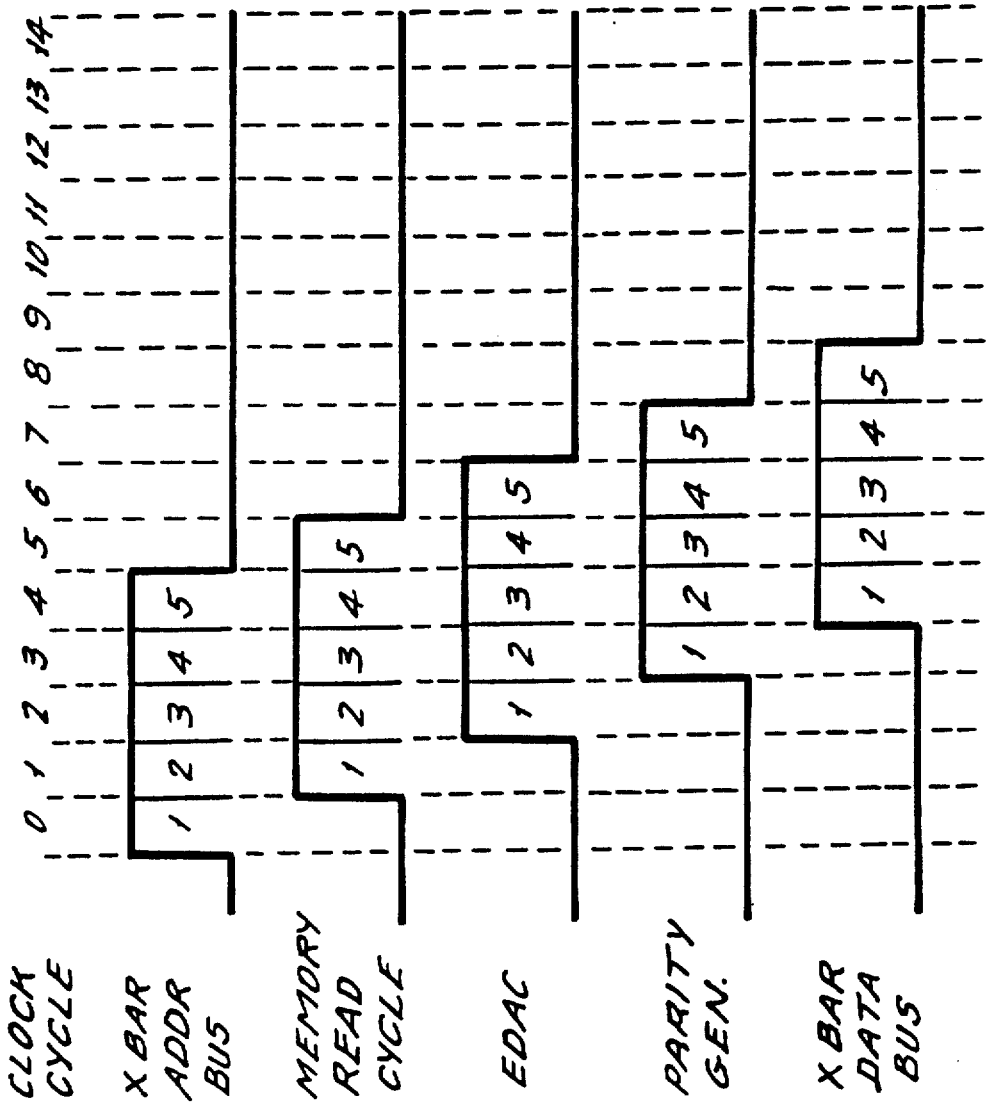
FIG. 13 is a timing diagram of the activity on the crossbar address bus and data bus for a four-cycle delay.

Since the reading of a data sample from memory involves the utilization of the crossbar address bus for a single cycle, followed by the subsequent use of the crossbar data bus either four or six cycles later, block reads can be performed at a rate of one read per instruction cycle with a PMEM designed for pipelined operation. A timing diagram illustrating the activity on the crossbar address bus and data bus for a memory read sequence of five samples with a four-cycle delay is presented in FIG. 13.

Interlaced patterns of memory reads and writes may be achieved as long as a processor does not attempt to write to a memory four cycles after a memory read has been initiated. To do so could cause a data bus clash since the processor cannot simultaneously transmit and receive data on crossbar data bus during the same instruction cycle. Similarly, if a six-cycle delay is selected, then no memory write cycle can be performed six cycles after a memory read has been initiated.

Several examples on the utilization of the crossbar switch with either a 4 or 6 pipeline delay are set forth in Section IV below.

III. Memory Mapping Control in Software

As mentioned previously, a key feature of the crossbar switch which distinguishes it from the prior art is the ability to completely control in software the mapping into parallel memory of array elements, particularly matrices and multi-dimensional arrays. The memory mapping function which maps the elements of an array into parallel memory requires two indices:

1) a tag number which indicates in which memory a piece of datum resides (hereinafter referred to as the ID#), and 2) a vertical address which indicates the location within the memory in which the datum resides (hereinafter referred to as the OFFSET).

The determination of the ID# and OFFSET associated with a particular datum of an N-dimensional array X, represented as $X[i1, i2, \ldots, iN]$, requires a four step process.

First, the address generator microcode software transforms the multidimensional specification $[i1, i2 \ldots, iN]$, into a single linear offset value LO. LO is a function of:

| | |
|---|---|
| (i) N | the number of dimensions |
| (ii) i1, i2, ... iN | the particular index values |
| (iii) S1, S2, ... SN | the size of each dimension |
| (iv) PE# | the processor ID number (not always required) |
| (v) and, most importantly, | the memory mapping technique. |

Second, the linear offset LO is added to the base address of X, denoted BAx, in order to calculate an element address, $EL(X[i1, i2, \ldots, iN]) = BAx + LO(i1, i2, \ldots iN)$.

Third, $EL(X[i1, i2, \ldots iN])$ is converted to a mapping address, MA. This is a function of number of PEs (#PE) and the number of parallel memories, (#PMEM); parameters which are downloaded from the node executive into each PE at the start of an algorithm. In particular, $MA = EL*8/\#PMEM$. The quantity $8/\#PMEM$ is referred to as the horizontal address spacing, or h, because incrementing the mapping address, MA, by this amount causes the next memory module (PMEM) to be addressed (see FIG. 3). For instance, for an 8 PMEM system, h=1, which is in accordance with the results discussed previously. The vertical address spacing, $\Delta = \#PMEM/h$, increments the MA to the next vertical memory location in a given PMEM. For instance, for an 8 PMEM system, the increment value necessary to access the next vertical location in the same PMEM is equal to 8(00 ... 1000). All three of the above steps are implemented in microcode software (firmware). Typically, all three steps are needed in order to calculate the initial MA values for each array in an algorithm, as well as the increments to be applied to these MA values. Thereafter, only a simple fixed point ADD instruction is needed to calculate the next mapping address for each array datum in a primitive. The quantity added is referred to as the address delta, or $\Delta$.

Fourth, a memory ID tag and memory vertical address are associated to the mapping address. This is done via the HORIZONTAL ADDRESS CONVERTOR hardware (shown in Table 1 below). The HORIZONTAL ADDRESS CONVERTOR (HAC) is programmable by the HOST computer 32 (FIG. 1).

To date, two memory mapping techniques for vectors (distributed vectors and channelized vectors), and three memory mapping techniques for matrices (odd column, even column and image matrices have been developed). These software techniques are applied across a broad spectrum of signal processing primitives. The variety of available memory mapping techniques in combination with the crossbar circuit previously described, allows for the full memory bandwidth to be utilized without crossbar clash occurring. Examples of these techniques are described later. The following text sets forth how programming of the HORIZONTAL ADDRESS CONVERTOR during initialization allows additional memory mapping techniques to be implemented.

In this implementation, any scalar, vector or multi-dimensional array datum is represented by a 27 bit mapping address, MA, appearing at the output of any of the multiple (1, 2, 4, or 8) PE address generators (see FIG. 3). As stated previously, the function ID# associates a parallel memory ID with a mapping address and the function OFFSET generates a vertical address within a specific parallel memory. The ID and OFFSET functions are implemented using programmable hardware. The vertical address function is simply equal to the topmost 24 bits of the MA. The ID function is a table lookup which uses the bottom 3 bits of MA, referred to as the logical memory number, to generate a physical memory ID from 0 to 7. The contents of the table at this index value is the memory number. This table is implemented using the HORIZONTAL ADDRESS CONVERTOR shown in Table 1, whose contents are downloaded from the host processor during configuration. Normally, the host configuration software for our system loads identically the Horizontal ADDRESS CONVERTOR into each PE according to the following table:

TABLE 1

Standard HORIZONTAL ADDRESS CONVERTOR TABLE

| SYSTEM CONFIGURATION (number PEs, number PMEMs) | LOCATION (logical ID#) | CONTENTS (physical ID#) |
|---|---|---|
| 1PE, PMEM | 0 | 0 |
| | 1,2,3,4,5,6,7 | 0 (see note 1) |
| 2PE, 2PMEM | 0 | 0 |
| | 1,2,3 | 0 (see note 1) |
| | 4 | 1 |
| | 5,6,7 | 1 (see note 1) |
| 4PE, 4 PMEM | 0 | 0 |
| | 1 | 0 (see note 1) |
| | 2 | 1 |
| | 3 | 1 (see note 1) |
| | 4 | 2 |
| | 5 | 2 (see note 1) |
| | 6 | 3 |
| | 7 | 3 (see note 1) |
| 8PE, 8 PMEM | 0 | 0 |
| | 1 | 1 |
| | 2 | 2 |
| | 3 | 3 |
| | 4 | 4 |
| | 5 | 5 |
| | 6 | 6 |
| | 7 | 7 |

Note 1: these addresses are never generated; the microcode causes all generated addresses to be multiples of 8/#PMEM where #PMEM is the number of PMEMs.

Although the above scheme is the standard method for programming the HORIZONTAL ADDRESS CONVERTOR, special applications may demand a different technique. Two examples are now described as follows:

(a) Alternative HORIZONTAL ADDRESS CONVERTER Technique #1 (MIMD Architecture)

When data from many channels is available, it becomes more efficient to allow the PEs in a multiple-PE system to execute simultaneously independent tasks. This is particularly important when a task is inherently not parallelizeable, for example, a recursive real infinite impulse recursive (IIR) filter. In this example, Q elements from previous output filtered samples of data must be processed with a recursive IIR filter, while P elements of input data are processed with a non-recursive finite impulse response (FIR) filter in order to produce one new output sample. The filter order and filter coefficients for each vector are independent and supplied with the data. The IIR and FIR coefficients are both real. Assuming an 8 PE×8 PMEM system as shown in FIG. 1, it is much more efficient to process multiple vectors of data simultaneously than to try to process only one vector at a time. The recursive nature of the IIR filtering implies that 8 PEs cannot produce the output vector any faster than one PE can. However, if each PE can be "decoupled" from the others by allowing it to have exclusive use of one of the eight memories, then eight independent vectors could be processed simultaneously. In the present invention, this can be accomplished in two ways; (i) either by programming of the HORIZONTAL ADDRESS CONVERTOR (illustrated in Table 2 below) or (ii) by programming the address generators to generate addresses contained within a specific memory. The system implementation of the invention allows an entire vector to be located entirely in a single memory (See FIG. 5). Hardware mapping schemes, such as described in U.S. Pat. No. 4,051,551 to Laurie, even with parametric software control, do not allow this possibility. For this problem, the HORIZONTAL ADDRESS CONVERTOR for each PE is programmed differently, as follows:

TABLE 2

HORIZONTAL ADDRESS CONVERTOR TABLE for multi-channel Recursive IIR Filter.

| 8 × 8 System PE NUMBER | LOCATION (logical ID#) | CONTENTS (physical ID#) |
|---|---|---|
| 0 | 0 | 0 |
| | 1-7 | 0 (see note 1) |
| 1 | 0 | 1 |
| | 1-7 | 1 (see note 1) |
| 2 | 0 | 2 |
| | 1-7 | 2 (see note 1) |
| 3 | 0 | 3 |
| | 1-7 | 3 (see note 1) |
| 4 | 0 | 4 |
| | 1-7 | 4 (see note 1) |
| 5 | 0 | 5 |
| | 1-7 | 5 (see note 1) |
| 6 | 0 | 6 |
| | 1-7 | 6 (see note 1) |
| 7 | 0 | 7 |
| | 1-7 | 7 (see note 1) |

The HORIZONTAL ADDRESS CONVERTOR is basically set up so that each PE accesses only its own dedicated memory. The microcode for the IIR primitive use one PE and one PMEM memory to process the data. It is identical to the microcode which solves the same problem for "normal" (1×1, 2×2, 4×4, 8×8) memory mapping. This is possible because the microexecutive controller downloads the configuration information consisting of the number of PEs and PMEMs to each PE, which then uses it to calculate the addressing parameters of the primitive. With this HORIZONTAL ADDRESS CONVERTOR setup, primitives on each processor/memory pair can be started by the microexecutive either asynchronously or synchronously with no possibility of memory clash. This is ideal for the problem presented, allowing parallelization of an otherwise serial-only algorithm.

(b) Alternative HORIZONTAL ADDRESS CONVERTOR - PE/PMEM Failure Compensation

For fault tolerant applications, the host or microexecutive software uses the HORIZONTAL ADDRESS CONVERTOR to allow continued operation if one of the eight (in the case of an 8PE×8PMEM system) PE modules fails. In this case, it is desirable to continue to use all eight memory modules, although only four of the PE modules will continue to be used. Any four of the remaining seven PE modules will be enabled and assigned IDs zero through three. The HORIZONTAL ADDRESS CONVERTOR used in these PEs would be identical to the 8PE×8PMEM table shown above. Existing microcode primitives would continue to function properly, albeit at half the speed, since each PE would read configuration information indicating four PEs and eight PMEMs. For this particular case, the address delta is 8*#PE/#PMEM which is 4. This steers each PE from one set of 4 PMEMs to the other set of 4 PMEMs on alternate iterations.

In the case of a memory failure, both the number of processors and the number of memories are cut in half, but this reconfiguration is done entirely by reconfiguring the HORIZONTAL ADDRESS CONVERTOR for a 4×4 system, and downloading the proper information to the PE configuration registers. In contract, in U.S. Pat. No. 4,051,551 to Laurie, a failure of either PE or PMEM would require the module translators and the multiplication inverse ROM to be replaced physically or be redesigned to accept variable inputs.

IV. Selectable Pipeline Delays

The two exemplary algorithms is now set forth to illustrate distributed vector memory mapping and the method by which PE firmware controls the XBAR and the use of selectable pipeline delays:

(a) VECTOR/VECTOR ADD primitive.
(b) VECTOR/SCALAR ADD primitive.
(a) VECTOR/VECTOR ADD PRIMITIVE In the VECTOR/VECTOR ADD primitive, a vector X is added element by element to a vector Y, and the result is placed in vector Z. FIG. 4 shows how the vectors are distributed across the eight parallel memories (PMEMs), such that every eighth element of X or Y or Z is in the same PMEM. As shown, however, there is no requirement for X[0], Y[0] and Z[0] to be located in the same PMEM. This primitive will also illustrate how the addition of two additional clock cycles of pipeline delay in the XBAR, making a total of six, allows 100% utilization of the crossbar bidirectional data bus for data transfer into and out of the PMEMs in the inner loop (kernel) of the primitive.

Each of the eight PEs is passed the same primitive/configuration data in its Input Register File 28 (FIG. 2a), namely, (i) BAx BAy, BAz—the base addresses of vectors X, Y, Z.

(ii) N, the number of points to process (length of vectors).

(iii) NMEM, the number of 32 bit wide parallel memories (PMEMs). NMEM is actually passed as the Log2 (#PMEM) so that shifting can be used in the calculations as opposed to multiplication or division.

(iv) NPE, the number of processing elements, passed as Log2 (#PE).

(v) p, the processor ID number, $0 \leq p \leq \#PE-1$. This is the only parameter which is different for each PE.

The primitive proceeds as follows:

1. Initialization: Each PE calculates the number of vector elements which it will add. This equals $(N-p-1)/\#PE+1$. For example, if we assume $N=25$, then PE0 will do four iterations and PE1-7 will do three iterations.

2. Initial address calculations: Each PE calculates the initial "read" mapping address (MA) for X and Y, MAxo and MAyo, and the initial "write" mapping address, MAzo.

$$MAxo = (BAx+p)*h,$$

$$MAyo = (BAy+p)*h$$

$$MAzo = (BAz+p)*h$$

where $h = 8/\#PMEM$.

PE0 will start with X(0), Y(0) and Z(0), PE1 will start with X(1), Y(1) and Z(1), etc. The initial values MAx0, MAy0, MAz0 are assigned to "working registers MAX, MAY and MAZ within the ADDRESS ALU 22 (FIG. 2a).

3. Delta address calculations: DELX, DELY and $DELZ = 8*\#PE/\#PMEM = h*\#PE = 8$.

4. The XBARDELAY INPUT (FIG. 2b) is set to 1, indicating a six cycle crossbar. (i.e. an extra delay of two cycles to the standard four cycle delay). XBARDELAY is passed to the XBAR on the Address Bus. The reason for this will become apparent later on.

The ADDRESS FIFO and DATA FIFO (FIG. 2b) are cleared. The functions of these components will become clear as the discussion progresses.

5. The remainder of the primitive is the inner loop or kernel. Each step from here on represents one clock cycle, with everything within the step happening in parallel. For each PE, the ADDRESS and DATA SECTION can be microcoded separately since architecturally they have been designed as separate hardware (See FIG. 2a).

Kernel Steps

CLOCK DESCRIPTION

Figure 2B:
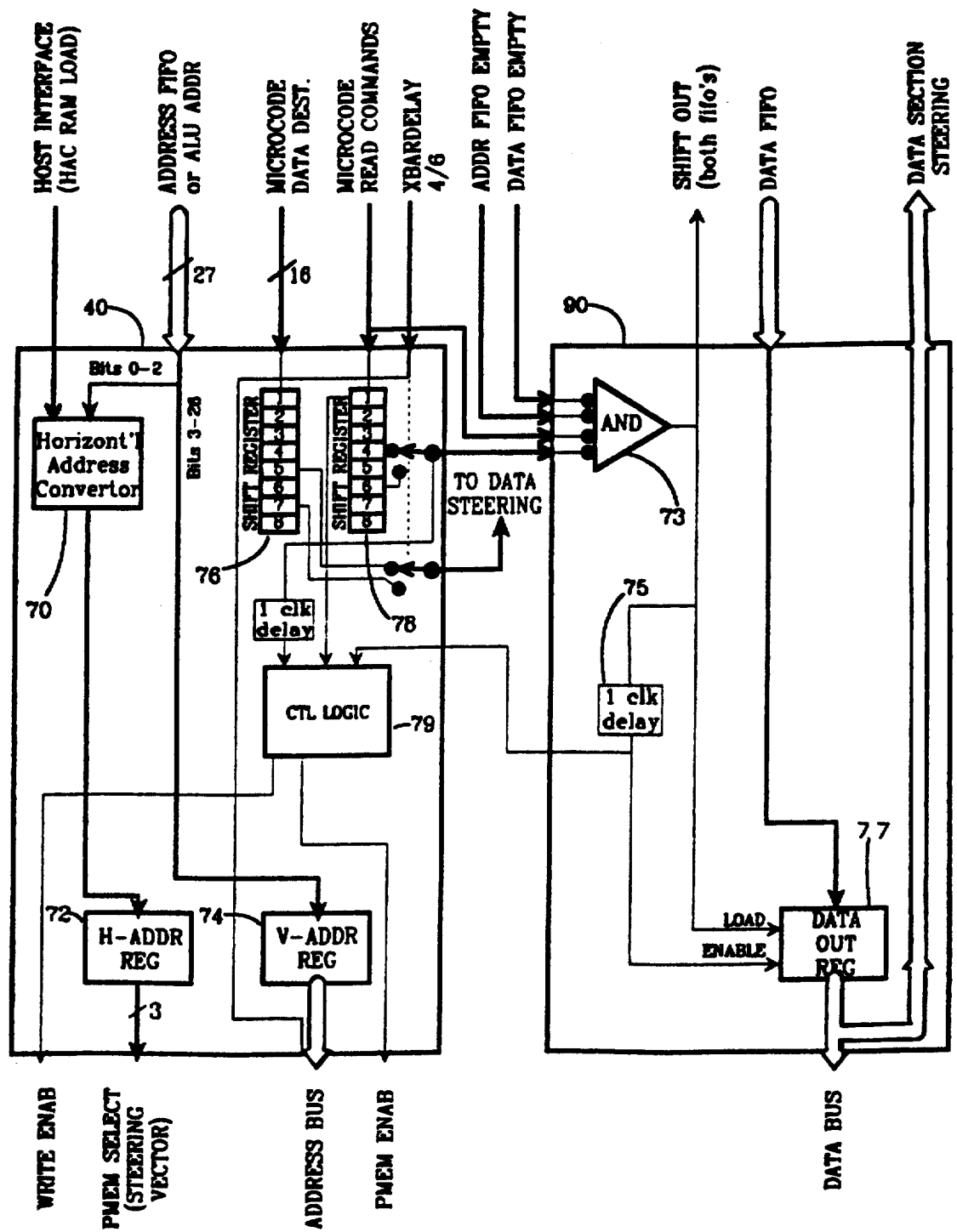
FIG. 2b shows a block diagram of the READ/WRITE control logic of a processing element (PE).

Cycle 0:

0a. ADDRESS SECTION microcode: issues a "READ" command causing Mapping Address MAX to be presented to the respective HORIZONTAL ADDRESS CONVERTOR 70 (HAC; FIG. 2b) of each PE. For X starting at #0000 (where '#' indicates hexadecimal) as shown in FIG. 4, PE0 will present address #0000, PE1 will present #0001, etc. The output of the HAC 70 is loaded into the Addr Register 72 and V-Addr Register 74 at the output of the PE (FIG. 2b). This is identical to the input, as shown in the 8×8 HAC Table 1.

0b. ADDRESS SECTION microcode: the address generator ALU 22 is commanded to add MAX to DELX. At the end of the clock cycle, MAX is replaced by the ALU output. This causes MAX to advance by eight memory locations within the X-Vector, in each of the PEs.

0c. As a result of the "READ", the input stage of SHIFT REGISTERS 76 and 78 (FIG. 2b) are loaded with the following information to control the memory read cycle without further intervention of the PE firmware:

1. The MICROCODE READ COMMAND causes a "1" to be stored at the input of SHIFT REGISTER 78 in FIG. 2b. This 1-bit will percolate down the successive stages 1-8 of the shift register on successive clock cycles. Thus, a "1" at stage 6 of SHIFT REGISTER 78 indicates that a READ command was issued 6 clock cycles earlier.

2. The 16 bit MICROCODE DATA DEST (FIG. 2b) field controls the first destination (8 bits) and the second destination (8 bits) for the data to be read from memory. In this case, the first destination is Rφ in register file 18 of the data section (FIG. 2a). No second destination is specified. The data destinations are leaded into SHIFT REGISTER 72 of FIG. 2B. Seven clock cycles later, when the data is returning to the PE from PMEM, the destinations will be available on tap 7 of the shift register, to be used to control data steering logic inside the PE.

In this case, the field specifies that register R0 in the DATA SECTION of the PE will be the destination.

1a. ADDRESS SECTION microcode: issues a "READ" command causing Mapping Address MAY to be presented to the respective HAC 70 (FIG. 2b) of each PE. For Y starting at location #002A as shown in FIG. 4, PE0 will present address #002A(-hex), PE1 will present #002B, etc. the output of the HAC 70 is loaded into H-ADDRESS REGISTER 72 (FIG. 2b). This is identical to the input, as shown in the 8×8 HAC Table 1, above.

1b. ADDRESS SECTION microcode: at the end of the clock cycle, the register inside the address generator ALU which contains MAY is updated according to the following equation: MAY=MAY+DELY 1c. SHIFT REGISTERS 72 and 78 (FIG. 2b) are loaded with the following information to control the memory read cycle without further intervention of the PE firmware:

1. The microcode "READ" command causes a "1" to be stored at the input of shift register 78 in FIG. 2b (position 1 is also a "1" since there was a READ command on the last clock cycle).
2. The 16 bits of data destination (FIG. 2b) from the microcode are stored at the input of shift register 76. Seven clock cycles later, this data will appear on tap 7 of shift register 76 and will be used to control the steering of the requested data (Y(0 . . . 7)) to the appropriate location: In this particular case, the data destination is register R1 in the data section register file 18 (FIG. 2a).

1d. The MEMREAD bit, associated with the first read in each PE of the X-Vector, appears on tap 1 of SHIFT REGISTER 78 (FIG. 2b). The address generator control logic 40 (FIG. 2a) causes the PMEM SELECT output of the PE to encode the memory in which the data word is located and simultaneously, the ADDRESS BUS of the PE to contain the vertical address of the location within this PMEM. This causes one of the 8×8 28 bit unidirectional crossbar switch 110 (FIG. 12) within the 8×8×28 bit XBAR switch (FIG. 11) to be configured, and the ADDR REG 80 in the selected PMEM module (FIG. 14) captures the 24 bit X address. Specifically, since the 3 LSBs (indicating logical memory ID) of MAX in step 0 were binary 000 for PE0, and the output of the HAC (physical ID) for input 0 is also 0, this implies that the ADDR REG in PMEM0 latches OFFSET(0) from PE0. Simultaneously, the ADDR REG in PMEM1 latches OFFSET (1) from PE1, ADDR REG in PMEM #2 latches OFFSET(2), etc. Recalling that OFFSET (X) is the top 24 bits of the 27 bit quantity X, all eight PMEMs receive the same address, 0, in their ADDR REGs 80. Referring to FIG. 4, this is exactly what is desired in order to fetch the first eight values of X into the eight PEs.

1e. Note that nothing in the design of the XBAR prevents two PEs from attempting to read data from the same PMEM on the same clock cycle. If this were to happen and the addresses were different, a crossbar clash would occur. The implementation of the software algorithm prevents this, since the definitions of MAX, MAY, MAZ always causes eight sequential addresses located in different PMEMs to be generated on each clock cycle of the kernel.

2a. ADDRESS SECTION microcode: issues a "WRITE" command causing Mapping Address MAZ to be presented to the respective HAC 70 of each PE. For Z starting at location #0056 as shown in FIG. 4, PE0 will present address #0056 (hex), PE1 will present #0057, etc. The output of the HAC 70 is loaded into the ADDRESS FIFO, (FIG. 2a) the purpose of which is to hold the addresses of locations in memory which must be written until the data for said memory locations has been calculated. Such a queue can be constructed from FIFO chips available from several manufacturers. Status bits indicating FIFO FULL, FIFO EMPTY, and FIFO ALMOST FULL are available to the MEMORY WRITE CONTROL LOGIC (FIG. 2a) and for general software usage.

2b. ADDRESS SECTION microcode: at the end of the clock cycle, MAZ is updated according to the following equation using the address generator ALU: MAZ=MAZ+DELZ 2c. The MEMORY WRITE CONTROL LOGIC 90 (FIG. 2a, 2b) is designed to detect when it is possible to write data to the appropriate PMEM module on the next clock cycle. Until the following conditions have been satisfied, the address and data are stored in the ADDRESS FIFO 30 and DATA FIFO 31 (FIG. 2a), respectively.

1. Both the ADDRESS FIFO 30 and DATA FIFO 31 must be non-empty at the beginning of the clock cycle.
2. A "read" request must not have been issued by microcode on the current clock cycle since the ADDRESS BUS would then be busy on the next clock cycle.
3. A "read" request must not have been issued 4 cycles ago by the microcode since the DATA BUS would then be busy on the next clock cycle, returning data from memory back to the PE. If the XBAR DELAY BIT is set to 1 (as is true for 6-cycle crossbar here), then a "read" request may not have been issued 6 cycles ago. This "4/6 test" is performed by testing the SHIFT REGISTER 78 at tap 4 or tap 6 (FIG. 2b).

The above conditions are detected by the AND gate 73 in FIG. 2b. When the above conditions are satisfied, the oldest data in the DATA FIFO 31 is written to the DATA OUT REG 77 (FIG. 2b) on the same clock cycle, and on the next clock cycle (due to 1 clk delay 75, FIG. 2b) to memory using the oldest address in the ADDRESS FIFO 30 (see paragraph 14a below).

2d. On this clock cycle, condition 1 is not satisfied, nothing having been written into the DATA FIFO 31 yet; the write sequence does not start.

2e. As a consequence of the X-Vector addresses being loaded into ADDR REG 80 (FIG. 14) of the selected PMEMs on the previous clock cycle, the control logic of each PMEM causes the selected memory location to be read from a bank 82 of RAM chips organized to be 39 bits wide (32 data bits plus 7 error correcting code bits) by ⅛th to 16 Mega-words deep. The design of this type of memory system is obvious to anyone of ordinary skill in the art. The output of the memory 82 is latched into a 39 bit wide holding register at the input of EDAC A or EDAC B, identified in FIG. 14 by reference numerals 84 and 86 respectively. On alternate clock cycles, either EDAC A (FIG. 14) or EDAC B will be used. Assume that EDAC A is used first. EDAC A now contains the value of X(0) in PMEM0, X(1) in PMEM1, etc., along with 7 error detection and correction (EDAC) bits.

2f. A "1" bit again appears on tap 1 of SHIFT REGISTER 78, (FIG. 2b), this time associated with the Y-Vector element to be read. The address generator control logic 79 (FIG. 2b) causes the PMEM SELECT output of the PE to encode the memory in which the data word is located and simultaneously, the ADDRESS BUS of the PE to contain the vertical address of the location within this PMEM. This causes the 8×8×28 BIT UNIDIRECTIONAL XBAR SWITCH 110 (FIG. 12) to be configured, and the ADDR REG 80 in the selected PMEM module (FIG. 14) to capture the 24 bit Y address. Since MAY in PE0 is #002A, the logical and physical memory number is 2, and OFFSET (#002A), or #000005 will be latched in ADDR REG 80 of PMEM2. Simultaneously,

```
OFFSET(#002B) = #000005 is latched into PMEM3
OFFSET(#002C) = #000005 is latched into PMEM4
OFFSET(#002D) = #000005 is latched into PMEM5
OFFSET(#002E) = #000005 is latched into PMEM6
OFFSET(#002F) = #000005 is latched into PMEM7
OFFSET(#0030) = #000006 is latched into PMEM0
OFFSET(#0031) = #000006 is latched into PMEM1
```

An examination of FIG. 4 shows that these are the first eight locations of array Y.

At this point in the processing, the Address Generator software repeats clock cycles 0,1,2 by using a loop in the microcode. As indicated under "Initialization" above, PE0 iterates five times, and PEs 1 . . . 7 iterate four times. Although the Address Generator software has reached "steady state", in order to fully understand the XBAR architecture, the interaction of hardware and software for each clock cycle is described for each clock cycle. The DATA SECTION software does not start until cycle 9. It also has a three instruction loop; the dual sequencer design of the PE allows this.

3a. ADDRESS SECTION microcode: issues a "READ" command causing Mapping Address MAX to be presented to the respective HORIZONTAL ADDRESS CONVERTOR (HAC) 70 (FIG. 2b) of each PE, as it did in cycle 0. The output of the HAC and vertical address bits 3–26 is loaded into the H-ADDR REG 72 and V-ADDR REG 74 of each PE. Since MAX has been incremented by DELX (8) in all PEs, the contents of the output registers now equal the physical addresses (PMEM ID# and OFFSET) of X(8) through X(15).

3b. ADDRESS SECTION microcode: at the end of the clock cycle, MAX is updated according to the following equation using the address generator ALU:
MAX=MAX+DELX 3c. As a consequence of the Y-Vector addressed being loaded into ADDR REG 80 (FIG. 14) of the selected PMEMs on the previous clock cycle, the control logic 88 of each PMEM causes the selected memory location to be latched into a 39 bit wide holding register at the input to EDAC B. This register now contains the value of Y(0) in PMEM2, Y(1) in PMEM3, . . . , Y(5) in PMEM7, Y(6) in PMEM0 and Y(7) in PMEM1.

3d. EDAC-A (FIG. 14) in each PMEM starts error detection and correction for the eight X values (32 bits plus 7 EDAC bits). This is a two clock cycle process.

4a. ADDRESS SECTION microcode: issues a "READ" command causing Mapping Address MAY to be presented to the respective HAC 70 of each PE, as it did in cycle 1. The output of the HAC 70 is loaded into ADDRESS OUTPUT REGISTER 71 of each PE. Since MAY has been incremented by 8 (see 1e), the contents of the eight ADDRESS OUTPUT REGISTERS contain the physical addressed (PMEM ID# and OFFSET) of Y(8) through Y(15). SHIFT REGISTER 78 is loaded as described in 0c and 1c, to control the read cycle.

4b. ADDRESS SECTION microcode: at the end of the clock cycle, MAY is updated according to the following equation using the address generator ALU:
MAY=MAY+DELY 4c. The "read" addresses for X(8) through X(15) are transferred across the crossbar to the appropriate PMEMs (0 through 7; See 1d).

4d. EDAC-B (FIG. 14) in each PMEM starts error detection and correction for Y(0)–Y(7).

4e. EDAC-A in each PMEM completes error detection, correction and parity generation for the eight X values (X(0) to X(7)). If the XBAR DELAY input to FIG. 2b was a "1" when the read sequence started (as is true here), the data is delayed two additional clock cycles using DELAYREG1 and DELAYREG2 in each PMEM (identified by references numerals 85 and 87 in FIG. 14). Otherwise the EDAC output would be latched into the MEMOUT register 89. The extra delay causes the X(0) to X(7) data to transfer across the crossbar on cycle 7 rather than cycle 5, allowing a single bidirectional data bus and unidirectional address bus to be used in the XBAR instead of two data busses and one address bus.

5a. ADDRESS SECTION microcode: issues a "WRITE" command for the addresses of Z(8) to Z(15) contained in the MAZ registers, which are then stored in the ADDRESS FIFO 30. MAZ=MAZ+DELZ is then executed by the address generator ALU 22. (See 2a, 2b for more detail). The ADDRESS FIFO 30 in each PE now contains two addresses.

5b. As described in 2e, X(8) through X(15) are read out of RAM 82 in PMEM #0 through PMEM #7 and placed into EDAC A (FIG. 14) of each PMEM.

5c. As described in 2f, the addresses of Y(8) through Y(15) are latched into PMEMs 2,3, . . . 7,0,1 respectively. This is a result of the READ command described in 4a above.

Figure 14:
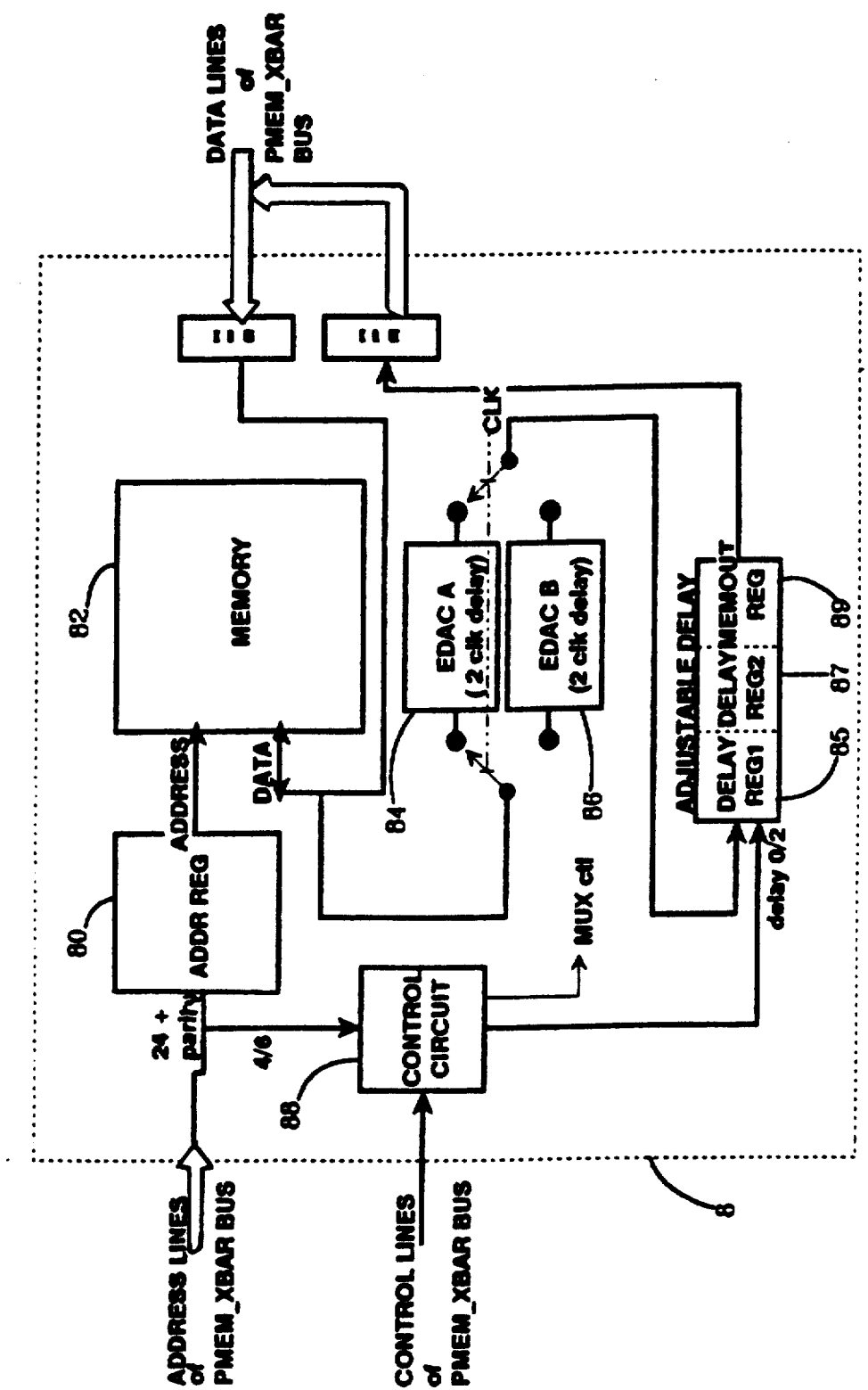
FIG. 14 is a block diagram of a Parallel Memory (PMEM) circuit.

5d. EDAC-B in each PMEM completes error detection, correction and parity generation for the eight Y values (Y(0) to Y(7)). The data is placed into DELAYREG1 (FIG. 14) but first DELAYREG1, containing X(0) to X(7) is copied to DELAYREG2. (FIG. 14).

6a. ADDRESS SECTION microcode: issues a "READ" command for X(16) through X(23). The addresses are stored in each PE's H-ADDR and V-ADDR REGISTERS 72, 74 after translation to physical ID/OFFSET by the HACs. (see cycle 0a) MAX=MAX+DELX (see cycle 0b).

6b. Y(8) . . . Y(15) data in PMEMs 2 . . . 7,0,1→EDAC B of each PMEM (see 3c).

6c. X(8) . . . X(15) data start error detection/correction in EDAC A of PMEMs 0 . . . 7 (see 3d).

6d. Y(0) . . . Y(7) in DELAYREG1 of PMEMs 2 . . . 7,0,1→DELAYREG2

6e. X(0) . . . X(7) in DELAYREG2 of PMEMs 0 . . . 7→MEMOUT register of PMEMs 0 . . . 7 (FIG. 14).

7a. ADDRESS SECTION microcode: READ command for Y(16) . . . Y(23), translation by HAC and stored in H-ADDR and V-ADDR REGISTERS 72, 74 of PEs 0 . . . 7 (see 1a).

7b. X(16) . . . X(23) addresses through XBAR to PMEMs 0 . . . 7 ADDR REG (see 1d).

7c. Y(8) . . . Y(15) start error correction/detection in EDAC B of PMEM's 2 . . . 7,0,1. (see 4d).

7d. X(8) . . . X(15), with completed error detection/correction/parity generation by EDAC A in PMEMs 0 . . . 7, is stored in DELAYREG1 of PMEMs 0 . . . 7. (see 4e).

7e. Y(0) . . . Y(7) in DELAYREG2 of PMEMs 2 . . . 7,0,1→MEMOUT register 89 (FIG. 14) of same PMEMs.

7f. X(0) . . . X(7) in MEMOUT register 89 of PMEMs 0 . . . 7 is transferred to the XBAR and then to PEs 0 . . . 7 as follows. Within the XBAR (FIG. 12) there is a programmable length shift register 112 associated with each of the PE's, which holds and delays the FPAU steering vector's (PMEM SELECT on FIG. 2b) associated with each "read" command. On this clock cycle (7), the delayed PMEM SELECT lines configure the bidirectional crossbar switch (8×8×36 bit) to properly connect each of the PMEM outputs to the bidirectional data bus of each of the PE's. Effectively each PE selects the bus specified by the delayed PMEM SELECT lines. At the same time, the data destination field that was specified in the microcode seven clock cycles earlier appears at tap 7 of shift register 76 (FIG. 2b). These bits control the muxing of the PE's data bus (FIG. 2a) into potential data destinations inside the PE. In this particular case, the data from x (0 . . . 7) is steered into register R$\phi$ in the register file 18 of the PE.

At this point it is instructive to look at the operation of the algorithm if the PE, XBAR and PMEM did not include the provision for two additional pipeline delay cycles. "Read" commands are issued on clock cycles 0, 1, 3, 4, repeating the pattern every three clock cycles. The address bus is therefore busy on clock cycles 1, 2, 4, 5, 7, 8, . . . . The data bus would be busy (transferring data from PMEM's to the PE's) on clock cycles 5, 6, 8, 9, 11, 12. Table 3 below shows lens usage attributable to the "read" commands.

TABLE 3

Bus utilization for Read Commands without variable delay XBAR starting at clock cycle 5, there are no clock cycles for which both the address bus and data bus are free, a necessary prerequisite for a "write" to PMEM to occur. The two additional clock cycles of delay effectively moves

| CLOCK CYCLE | ADDR BUS UTILIZATION | DATA BUS UTILIZATION |
|---|---|---|
| 0 | | |
| 1 | X | |
| 2 | X | |
| 3 | | |
| 4 | X | |
| 5 | X | X |

TABLE 3-continued

Bus utilization for Read Commands without variable delay XBAR starting at clock cycle 5, there are no clock cycles for which both the address bus and data bus are free, a necessary prerequisite for a "write" to PMEM to occur. The two additional clock cycles of delay effectively moves

| CLOCK CYCLE | ADDR BUS UTILIZATION | DATA BUS UTILIZATION |
|---|---|---|
| 6 | | X |
| 7 | X | |
| 8 | X | X |
| 9 | | X |
| 10 | X | |
| 11 | X | X |
| 12 | | X |
| 13 | X | |
| 14 | X | X |
| 15 | | X |
| 16 | | |

Bus utilization for Read Commands without variable delay XBAR starting at clock cycle 5, there are no clock cycles for which both the address bus and data bus are free, a necessary prerequisite for a "write" to PMEM to occur. The two additional clock cycles of delay effectively moves the right hand column down by two clock cycles, feeding both busses on every third clock cycle.

8a. ADDRESS SECTION microcode: WRITE command for Z(16.) . . . Z(23), address storage in ADDRESS FIFO 30; MAZ=MAZ+DELZ (via ALU address generator commanded by software). There are now three addresses in the ADDRESS FIFO 30 of each PE.

8b. Y(16) . . . Y(23) addresses thru XBAR to PMEM 2 . . . 7,0,1 ADDR REG 74. (see 2f).

8c. X(16) . . . X(23) data read from PMEMs 0 . . . 7 and stored in EDAC A 84 of each PMEM (see 2e)

8d. EDAC-B 86 in PMEMs 2 . . . 7,0,1 completes error detection, correction and parity generation for Y(8) through Y(15). The data is placed into DELAYREG1, but first DELAYREG1, containing X(8) to X(15) is copied to DELAYREG2. (see 5d).

8e. Y(0) . . . Y(7) in MEMOUT register of PMEMs 2 . . . 7,0,1 is transferred to the XBAR and then to PEs 0 . . . 7. by the same process described in 7f above, except that the data destination is register R1 of register file 18. Therefore, at the end of the clock cycle, Y(0) . . . Y(7) is located in R1 of PEs 0 . . . 7. X(0) . . . X(7) is still located in R$\phi$ of PEs 0 . . . 7.

At this point, the loop for the DATA SECTION software begins via a software controllable synchronizing signal from the ADDRESS SECTION microcode to the DATA SECTION microcode. The DATA SECTION microcode repeats cycles 9–11 the number of times specified in "Initialization", i.e., five times for PE0 and four times for PE's 1-7.

9a. DATA SECTION microcode copies R0 and R1, containing X(i) and Y(i) in PE#i, into the input registers of the floating point multiplier/adder 12 in number one (FPAU1) in the PE (FIG. 2a).

9b. ADDRESS SECTION microcode: repeat 6a, but for X(24) . . . X(31) (READ COMMAND).

9c. Repeat 6b, but for Y(16) . . . Y(23)

9d. Repeat 6c, but for X(16) . . . X(23)

9e. Repeat 6d, but for Y(8) . . . Y(15)

9f. Repeat 6e, but for X(8) . . . X(16)

10a. DATA SECTION microcode: PEs 0 . . . 7 add X(0) . . . X(7) to Y(0) . . . Y(7), placing result in the FPAU1 output register 12 (FIG. 2a).

10b. ADDRESS SECTION microcode: same as 7a, but for Y(24) . . . Y(31) (READ COMMAND).

10c-g. Same as 7b-f but all data indices increased by 8.

11a. DATA SECTION microcode: FPAU1 output register 12 is written to the DATA FIFO 31. Thus, at the end of the clock cycle the first eight outputs are in the DATA FIFO's of the 8 PE's, ready to be written back to the eight PMEM's. However, the conditions for starting the "write to "PMEM" sequence are not satisfied, since at the beginning of the clock cycle, the DATA FIFO 31 was still empty (see 2c).

11b. ADDRESS SECTION microcode: same as 8a but for Z(24) . . . Z(31) The ADDRESS SECTION microcode in PEs 1 . . . 7 now terminates, since the address generator loop as executed four times, which was the calculated loop count.

11c–f. Same as 8b–e but all data indices increased by 8

12a. DATA SECTION microcode copies R0 and R1, containing X(8+i) and Y(8+i) in PE#i, into the input registers of the floating point multiplier/adder 12 (FPAU1) in the PE. WRITE SEQUENCE to memory still does not start; condition three in paragraph 2c not satisfied since a "read" request was issued six cycles earlier by all PE's, and in the current cycle by PE0.

12b. ADDRESS SECTION microcode: PE0 ONLY: repeat 6a, but for X(32) (READ COMMAND)

12c–f. Repeat 6b–6e but for data indices eight larger.

13a. DATA SECTION microcode: PEs 0 . . . 7 add X(8) . . . X(5) to Y(8) . . . Y(15), placing result in the FPAU output register. No WRITE SEQUENCE yet (see 12a).

13b. ADDRESS SECTION microcode: PE0 ONLY: same as 7a, but for Y(32) (READ COMMAND).

13c–g. Same as 7b–f but all data indices increased by 16.

14a. DATA SECTION microcode: FPAU1 output register 12 is written to the DATA FIFO 31. Thus, at the end of this clock cycle the first sixteen outputs are in the DATA FIFO's (FIG. 2a) of the 8 PE's, ready to be written back to the eight PMEM's. For the first time the conditions specified in paragraph 2c for starting a WRITE SEQUENCE are met. A WRITE SEQUENCE follows a deterministic timing pattern over a period of three clock cycles as follows:

CLOCK CYCLE +0: At the end of the first clock cycle for which the three conditions specified in 2c are met, the first (i.e. earliest written) data word of the DATA FIFO is transferred to the DATA OUT register of the DATA SECTION, the horizontal steering vector (memory select) and the vertical address, associated with the first (i.e. earliest) address in the ADDRESS FIFO 30, are stored in the H_ADDR register 72 and V_ADDR register 74 at the output of the address section (FIG. 2b).

CLOCK CYCLE +1: Each PE's ADDRESS BUS, including 24 vertical address bits from the V_ADDR register 74 is vectored to appropriate PMEM by the PE's PMEM SELECT output. The PE's ENABLE and WRITE bits are both active, causing the FPAUN steering vectors shown on FIG. 12 (PMEM SELECT on FIG. 2b) to directly configure, without any shift-register generated delay, the 8×8×28 bit unidirectional crossbar switch 110 and the 8×8×36 bit bidirectional crossbar switch 118. Switch 110 is a bank of demultiplexor circuits which effectively steers each address bit of each address bus, in parallel, to one of eight PMEMXBAR busses in the same address bit position. Switch 118 similarly steers the data bits to the same PMEMXBAR bus. The addresses are latched into ADDR REG 80 in the PMEM's (FIG. 14) and the data is written into MEMORY 82 (FIG. 14). Since the Z-vector starts at address #56 in our example, the vertical address of #56 (top 24 of 27 bits), or #00000A is steered from PE0 to PMEM6 (bottom 3 bits, translated by HAC 70). Similarly PE1 sends vertical address #00000A to PMEM7, and PE's 2 . . . 7 send vertical address #000000B to PMEM's 0 . . . 5. The corresponding data Z(0) . . . Z(7) is sent through the data XBAR (32 bits+parity) to input registers in PMEMs 6, 7, 0 . . . 5.

CLOCK CYCLE+2: Error detection/correction bits are generated and the resulting data is written to the semiconductor memory devices inside the PMEMs.

Clock cycle 14 represents the last instruction of the DATA SECTION microcode loop. The code indicated in cycle 12 through 14 is repeated until the loop count specified in initialization has been satisfied.

14b, ADDRESS SECTION microcode: PE0 only, same as 8a but for Z(32)

14c–f. Same as 8b–e, except data indices increased by 8.

SUMMARY OF VECTOR/VECTOR ADD MACRO

The above example shows in detail how the crossbar is controlled by the software (microcode) in the implementation of a typical algorithm. Specifically, the following XBAR features are unique to the invention:

1. The use of an additional two cycles of pipeline delay within the memory read cycle, so that algorithms which require that the inner loop of the algorithm contains 3*n clock cycles (n, an integer) can execute with no additional wait states using a XBAR designed with a single bidirectional DATA BUS between processing elements (PE's) and memories (PMEM's).

2. A XBAR designed for pipelined parallel execution of software generated "read" and "write" commands, generated by multiple independent processing elements. In the example shown, once the pipeline has been filled, a "read" or "write" can occur on every clock cycle of the algorithm from all memories in parallel.

3. A crossbar architecture designed with features to simplify programming, specifically:

a. Automatic generation of the latching and enabling of buffers, registers and busses in the five to seven clock cycles following a software "read" command.

b. Inclusion of an ADDRESS FIFO 30 and DATA FIFO 31 (FIG. 2a) so that destination addresses may be generated before or after the data itself has been generated. This is a necessity for efficient implementation of algorithms such as Fast Fourier transform (FFT), which operate "in place", reading and writing to the same addresses, because it eliminates the necessity of generating the same addresses twice, first for reading in the old data, and then for writing the new data; instead the addresses are each saved in the ADDRESS FIFO 30 for future "writes" while the address is transferred to PMEM immediately for "reads".

c. Inclusion of MEMORY WRITE CONTROL LOGIC 40 (FIG. 2b) to automatically determine when data can be written to memory without clashing with the beginning or end of a READ sequence. This device also automatically controls the required latching and enabling of buffers, registers and busses in the two clock cycles after the start of the WRITE sequence.

SOFTWARE RULES FOR AVOIDING MEMORY CLASH (DISTRIBUTED VECTOR MAPPING)

Although it appears that the above algorithm for adding two vectors distributed across all PMEMs is highly complex, in fact, the software rules for avoiding memory clash when using distributed vector mapping (shown in FIG. 4) are relatively simple.

1. A read and write cannot occur in hardware on the same clock cycle. Therefore, the inner kernel of a macro must contain at least as many clock cycles as the sum of the number of reads from memory and the number of writes to memory. Of course, the DATA SECTION must also be able to finish the required data processing operations within the inner kernel time, K.

2. The programmer must choose the proper selectable pipeline delay of the XBAR (4 or 6 cycles) and the pattern of "reads" within the kernel. A write will not occur to memory if a read is taking place in the same cycle or:
   a. The XBAR DELAY is set for four cycles and a read command took place four cycles ago OR
   b. The XBAR DELAY is set for six cycles and a read command took place six cycles ago.

To allow the "writes" to memory to occur, it may be necessary to place the "read" commands within the K clock cycles at particular points. For example, assume that $K=8$ and that there are 4 "reads" and 4 "writes" within the K-cycle kernel. Then a pattern of RRRRXXXX, where each 'R' represents a "read" and each 'X' represents the absence of a "read", clearly would not work, with either four cycle or six cycle delay. Under six-cycle delay, a sequence of three consecutive kernels would look as follows:

RRRRXXXXRRRRXXXXRRRRXXXX and "writes" could only occur on the boldfaced Xs. Since only two of the required four "writes" could occur in each kernel, eventually the DATA FIFO capacity would be exceeded. It is also obvious that no "writes" could occur at all if a four cycle crossbar were selected. The solution is to alternate "reads" and "writes" by only doing a "read" on every other clock cycle.

In general, whenever the number of "reads" and "writes" is equal, a four cycle crossbar is used with "reads" occurring every other cycle or alternating pairs of reads and writes are used. When the algorithm demands twice as many "reads" as "writes", a six cycle crossbar is used, with a RRX pattern within the kernel. Both cases result in 100% efficiency of crossbar utilization. In other cases the variable delay XBAR gives great flexibility to the programmer in attempting to achieve maximum efficiency.

3. It is always possible to read or write M consecutive vector elements in an M-PE system without causing XBAR clash. However, if a macro needs to read or write more than one vector in its kernel, all PEs must read or write the same vectors at the same time, since vectors can start in arbitrary PMEMS.

4. If a macro requires that a vector be accessed with a stride, S, i.e., that only every S'th point in the vector be read or written, then the above statement is true if and only if "S" is odd. If "S" is even, then some PEs may have to drop out from processing.

5. For matrices mapped as odd column matrices, points three and four are true for both rows and columns of said matrices. For matrices mapped as even column matrices, 3 and 4 are true for rows of the matrix.

6. All matrix mapping schemes allow traversal of M adjacent rows or columns of the matrix in parallel. In some cases each PE starts its processing at a predetermined time delay relative to $PE\phi$.

7. All PE's (i=0, 1, ..., #PE) may access, in parallel, elements of a matrix described by the following formula, $X$ (qi, i+K) or $X$ (i+K, qi) where qi is any random integer and K is a constant. This type of access is required typically for data dependent algarithms, such as the Hough Transform or the previously described threshold replacement algarithm. This type of access requires that the matrix be mapped as an image matrix (width a multiple of #PE's). The above patterns of memory access are sufficient for all important matrix processing requirements in the field of the invention.

(b) VECTOR/SCALAR ADD PRIMITIVE

As a second example for the distributed vector mapping technique, the following text shows the implementation of the Vector/Scalar ADD Primitive, which adds the scalar, c, to a vector, X, to produce an output vector, Z, of the same length. However, only the software code, and the manner in which it controls the XBAR will be examined, since the operation of the XBAR has already been examined in great detail above. Each of the eight PEs is passed the same primitive/configuration data in its Input Register File 28 (FIG. 2a), namely, (i) BA(c), BA(X), BA(Z)—the base addresses of scalar c, vector X, Z.

(ii) N, the number of points to process (length of vectors).

(iii) NMEM, the number of 32 bit wide parallel memories (PMEMs). NMEM is actually passed as the Log2 of the number of PMEMs so that shifting can be used in the calculations as opposed to multiplication or division.

(iv) NPE, the number of processing elements, passed as Log2 (NPE).

(v) p, the processor number, $0 \leq p \leq NPE-1$. This is the only parameter which is different for each PE.

The primitive proceeds as follows:
1. Initialization: Each PE calculates the number of vector elements which it will add. This equals $(N-p-1)/NPE+1$. (Same as Vector/Vector ADD)
2. Initial address calculations: Each PE calculates the initial "read" mapping address (MA) for c and X, MAc and MAx0 and the initial "write" mapping address MAz0.

MAc=BA(c)*h, where h=8/#PMEM. This differs from Vector/Vector ADD since the scalar c occupies a single memory location which all PEs want to access.

Immediately upon calculating MAc, all PEs issue a READ command for this address, also indicating BROADCAST READ via a designated microcode command. The BROADCAST READ command causes only the designated MASTER PE (nominally #0) to activate the PMEM ENABLE output of the PE. Effectively this causes only the MASTER PE's address bus to be captured by the PMEM containing the scalar c, avoiding bus contention problems. However, all PEs which requested the BROADCAST READ will receive the data from this address a few clock cycles later.

$$MAx0 = (BA(X) + p)^*h$$

$$MAz0 = (BA(Z) + p)^*h$$

PE0 will start with X(0) and Z(0), PE1 will start with X(1) and Z(1), etc. Registers MAX and MAZ inside the address generator ALU 22 are set equal to MAx0 and MZz0, respectively.

3. Delta address calculations: DELX and DELZ = 8*-#PE/#PMEM = h*#PMEM.

4. The XBARDELAY is set to 0, indicating a four cycle crossbar and the ADDRESS FIFO 30 and DATA FIFO 31 are cleared (FIG. 2b). A four cycle XBAR is used for the following reasons. The macro need only read c once, and thereafter in its inner kernel will need to read one X value and write one Z value. Since the minimum kernel size is of length 2, the four cycle XBAR is selected since the number of reads and writes are equal (one each).

5. The remainder of the primitive is the inner loop or kernel. Each step from here on represents one clock cycle, with everything within the step happening in parallel, and simultaneously in all PEs.

The ADDRESS SECTION kernel is as follows (two instructions repeated for the number of iterations calculated above):

CLK0

Issue READ command for address MAX, destination = R1,

The XBAR hardware will automatically generate the read sequence, in which the address will be sent to the proper PMEM across the XBAR on CLK 1 and the data for X(i + K*8), where i is the PE number and K is the iteration number starting at 0, will be sent from this PMEM to R1 in the DATA SECTION on CLK 5. In fact, the XBAR will be utilized for writing addresses and reading data on every odd numbered clock cycle thereafter.

Update MAX: MAX→MAX + DELX;

CLK1

Issue WRITE command for address MAZ;
Update MAZ: MAZ→MAZ + DELZ;

The DATA SECTION kernel starts 6 clock cycles after the ADDRESS SECTION kernel, when Y(i) is available in R1 of each PE#i, for i = 0 to 7.

CLK6

Move R0, containing scalar c, to "R" register of floating point multiplier accumulator chip number one (FPAU1-R);
Move R1, containing Y(i), to "S" register of FPAU1 (FPAU1-S);

The remaining two clock cycles are repeated for the number of iterations calculated above:

CLK7

Multiply FPAU1-R by FPAU1-S, placing result in FPAU1 output register;

CLK8

Output FPAU1 output register to the DATA FIFO 31; The MEMORY WRITE CONTROL LOGIC 40 will automatically retrieve the correct address from the ADDRESS FIFO 30 and send it, with the data from the DATA FIFO 31, across the XBAR on even numbered clock cycles so as not to interfere with "read" of the Y vector.

Move R1, containing X(i + K*8) to FPAU1-s. The loop of CLK 7, CLK 8 repeats until the last Z value has been written to the DATA FIFO 31. The MEMORY WRITE CONTROL LOGIC 40 controls the emptying of this data into PMEM. This concludes the Vector/Scalar ADD example.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A crossbar switch in a computer system for simultaneously interconnecting a plurality of processing elements to a plurality of memories, said processing elements selecting said memories by steering vectors, said plurality of processing elements and memories being equal in number when the system is fully operational and said plurality of processing elements being half the number of memories when the system operates in a degraded mode due to the failure of one processing element, wherein each of said processing elements can be connected to a respective selected memory for a memory read or write, or all of said processing elements can be connected to a single selected memory for a broadcast memory read, said crossbar switch comprising:

a multiplexer section for interconnecting said processing elements and memories during memory reads and memory writes by providing switching of signal paths between said processing elements and said memories; and a control section coupled to said multiplexer section for controlling said signal path switching to allocate said signal paths in accordance with said steering vectors, said steering vectors being determined synchronously on each clock cycle by an algorithm under execution and thereby controlling the interconnection of said processing elements with said memories, said control section including control circuitry for creating pipeline delay during memory reads of said steering vectors and of data returning from said memories specified by said steering vectors.

2. A crossbar switch as recited in claim 1, further comprising means in said control circuitry for adjusting the length of time of said pipeline delay in accordance with said algorithm under execution.

3. A crossbar switch as recited in claim 2, wherein the length of time of said pipeline delay is selectable in software between either four or six cycles of delay to match, respectively, either the minimum delay inherent in reading data from said memories or the read/write pattern of the algorithm under execution.

4. A crossbar switch as recited in claim 1, wherein a bidirectional data bus is used for data transfer between said processing elements and said memories.

5. A crossbar switch as recited in claim 1, wherein memory reads and memory writes are interlaced in real time.

6. A crossbar switch as recited in claim 1, wherein said signal paths are switched on a cycle-by-cycle basis of a clock of said computer system.

7. A crossbar switch as recited in claim 1, wherein said crossbar receives 64 signals comprised of 24 address bits, 3 address parity bits, 1 delay select bit, 32 data bits, and 4 data parity bits.

8. A crossbar switch as recited in claim 1, comprising an 8×8×64 crossbar switch formed of 16 8×8×4 cards.

9. A crossbar switch as recited in claim 1, comprising a 4×4×64 crossbar switch formed of 8 4×4×8 cards.

10. A crossbar switch as recited in claim 1, comprising a 2×2×64 crossbar switch formed of 4 2×2×16 cards.

11. A crossbar switch as recited in claim 1, wherein said steering vectors comprise a three-bit code which identifies a specific memory to be accessed by a processing element.

* * * * *